(12) United States Patent
Kim et al.

(10) Patent No.: US 8,379,756 B2
(45) Date of Patent: Feb. 19, 2013

(54) METHOD FOR MULTIPLEXING DATA INFORMATION AND CONTROL INFORMATION IN WIRELESS COMMUNICATION SYSTEM

(75) Inventors: Ki Hwan Kim, Gyeonggi-do (KR); Jae Hoon Chung, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 281 days.

(21) Appl. No.: 12/678,852

(22) PCT Filed: Sep. 18, 2008

(86) PCT No.: PCT/KR2008/005518
§ 371 (c)(1),
(2), (4) Date: May 27, 2010

(87) PCT Pub. No.: WO2009/038364
PCT Pub. Date: Mar. 26, 2009

(65) Prior Publication Data
US 2010/0246604 A1    Sep. 30, 2010

Related U.S. Application Data

(60) Provisional application No. 60/973,724, filed on Sep. 19, 2007, provisional application No. 60/974,145, filed on Sep. 21, 2007, provisional application No. 60/982,142, filed on Oct. 24, 2007, provisional application No. 60/982,735, filed on Oct. 26, 2007, provisional application No. 60/985,287, filed on Nov. 5, 2007.

(30) Foreign Application Priority Data

Aug. 18, 2008    (KR) .......................... 10-2008-0080463

(51) Int. Cl.
*H04L 27/00* (2006.01)
(52) U.S. Cl. ...................................................... 375/295
(58) Field of Classification Search ................. 375/265, 375/262, 260, 295, 298; 714/755, 758, 792, 714/780
See application file for complete search history.

(56) References Cited

U.S. PATENT DOCUMENTS

| | | | |
|---|---|---|---|
| 7,843,888 B1 * | 11/2010 | Wang et al. | 370/334 |
| 2007/0010268 A1 | 1/2007 | Kim et al. | |
| 2007/0064666 A1 | 3/2007 | Kwun et al. | |
| 2007/0183384 A1 | 8/2007 | Kwak et al. | |
| 2008/0240022 A1 | 10/2008 | Yoon et al. | |

FOREIGN PATENT DOCUMENTS

| | | |
|---|---|---|
| KR | 10-2005-0009663 A | 1/2005 |
| KR | 10-2005-0053312 A | 6/2005 |
| KR | 10-2007-0027999 A | 3/2007 |
| KR | 10-2007-0074438 A | 7/2007 |
| WO | WO 03/003776 A2 | 1/2003 |
| WO | WO 2007/084482 A2 | 7/2007 |

* cited by examiner

*Primary Examiner* — Chandrahas Patel
(74) *Attorney, Agent, or Firm* — Birch, Stewart, Kolasch & Birch, LLP

(57) ABSTRACT

A method for multiplexing a control information stream, and a data information stream comprised of systematic symbols and non-systematic symbols in a wireless mobile communication system is described. The multiplexing method includes mapping the data information stream to a resource area, so that the systematic bit symbols are not mapped to a specific resource area where the control information stream is to be mapped, and mapping the control information stream to the specific resource area.

11 Claims, 26 Drawing Sheets

(a)

(b)

(a)

(b)

METHOD FOR MULTIPLEXING DATA INFORMATION AND CONTROL INFORMATION IN WIRELESS COMMUNICATION SYSTEM

This application is the National Phase of PCT/KR2008/005518 filed on Sep. 18, 2008, which claims priority under 35 U.S.C. 119(e) to U.S. Provisional Application Nos. 60/973,724, filed on Sep. 19, 2007, 60/974,145 filed on Sep. 21, 2007, 60/982,142 filed on Oct. 24, 2007, 60/982,735 filed on Oct. 26, 2007, and 60/985,287 filed on Nov. 5, 2007 and under 35 U.S.C. 119(a) to Patent Application No. 10-2008-0080463 filed in Republic of Korea on Aug. 18, 2008. All of which are hereby expressly incorporated by reference into the present application.

TECHNICAL FIELD

The present invention relates to a method for multiplexing data information and control information and mapping the data information and control information to a physical transmission channel in a wireless mobile communication system.

BACKGROUND ART

Data and control streams transmitted to a physical layer from a media access control (MAC) layer provide transport and control services through a wireless transmission link after an encoding process. A channel coding scheme is performed by a combination of processes for mapping error detection, error correction, rate matching, interleaving, and transport channel information and control information to a physical channel. Data transmitted from the MAC layer includes systematic bits and parity bits by the channel coding scheme.

The data stream may be transmitted in a state of being multiplexed with the control stream on the physical channel. In this case, control symbols of the control stream may overwrite a part of data symbols of the data stream. Then a part of the data symbols may be lost due to the overwritten control symbols.

FIG. 1 (a) illustrates a conventional method for mapping data symbols to resource elements (REs) of a physical transmission channel. Here, the 'data symbol' may refer to a stream of 'bits' which are generated when a transport block passes through a CRC attachment unit, a channel coding unit, a rate matching unit, and/or a code block concatenation unit or may refer to a stream of 'symbols' consisting of those 'bits'. The data symbol may be coded symbols. The data symbol may be comprised of a systematic symbol and a non-systematic symbol. The non-systematic symbols may be a parity symbol. In a system using orthogonal frequency division multiplexing (OFDM), one symbol is mapped to one resource element and one symbol may be comprised of one or more bits according to a modulation order (Qm). For example, one symbol may be comprised of two bits as in quadrature phase-shift keying (QPSK) and may be comprised of four bits as in 16 quadrature amplitude modulation (QAM). If a binary phase-shift keying (BPSK) scheme is used, one data symbol may represent one data bit. Therefore, if the modulation order is 2, one systematic symbol may be comprised of 2 systematic bits. The same is applied to the parity symbol.

Each index of a buffer shown in an upper part of FIG. 1 (a) indicates one data symbol. As shown, data symbols are input to a cyclic buffer included in a rate matching unit of a transmission channel processor and output by a predetermined method. The cyclic buffer shown in FIG. 1 (a) may be replaced with any buffer in a multiplexing processor of a wireless mobile communication system. In FIG. 1 (a), data symbols from index 0 only to index 14 are exemplarily illustrated. Data symbols input and output to and from one cyclic buffer may include multiple redundancy versions which can be specified by a hybrid automatic repeat request (HARQ) scheme. Each index of the cyclic buffer may correspond to each of resource elements. Here, a set of systematic symbols consisting of one or more symbols, or a set of parity symbols consisting of one or more symbols is mapped to the resource elements.

In more detail, FIG. 1 (a) illustrates a conventional method for mapping the data symbols to a physical transmission channel on a resource element basis or on a symbol basis. In FIG. 1 (a), n data symbols are directly mapped to a multiplexing block buffer within n multiplexing blocks. Indexes of the buffer within the multiplexing block may correspond to respective resource elements one by one. Here, being 'directly' mapped means that n successive data symbols are successively and sequentially mapped to the multiplexing block buffer.

FIG. 1 (b) illustrates a conventional multiplexing method. As in the method of FIG. 1 (b), when n data symbols are mapped to the multiplexing block buffer, a control symbol indicating control information may be mapped, instead of the data symbol, to a specific position of the multiplexing block buffer. According to this method, the data symbols are sequentially mapped to the multiplexing block buffer. At this time, the data symbol is replaced with the control symbol at a position where the control symbol is mapped. Namely, the data symbol is overwritten by the control symbol.

FIG. 2 illustrates a phenomenon wherein a part of data symbols are lost during a multiplexing process.

Data symbols within any redundancy version may be comprised of, for example, one set of data symbols consisting of systematic symbols (index 0 to index 8) and one set of parity symbols consisting of parity symbols (index 9 to index 11) as shown in FIG. 2. Especially, in case of redundancy version #0, a probability of being configured in systematic symbols-parity symbols order.

Referring to FIG. 2, since a control symbol is mapped on a resource element RE5, a data symbol of index 5 of redundancy version #0 is not mapped on a resource element. The data symbol of index 5 in FIG. 2 is a systematic symbol. Accordingly, the systematic symbol is lost and thus an error rate for transmission data may be increased.

FIG. 3 illustrates a conventional structure in which code blocks for transmission are mapped to a physical transmission channel.

Referring to FIG. 3, 4 code blocks are used. Each code block may be comprised of output symbols output from the multiplexing block buffer of each of FIGS. 1 (a) and (b), and FIG. 2. As shown in FIG. 3, one transmission time interval (TTI) may be one subframe comprised of 2 slots. A physical transmission channel may be defined by the slots and frequency regions shown in FIG. 3. Each code block is separated into two blocks which are respectively mapped to the slots. For example, code block #0_0 mapped to slot 1 and code block #0_1 mapped to slot 2 are blocks separated from one code block #0. In FIG. 3, 4 code blocks are mapped by time division within one slot having a length of 0.5 ms.

Since the code blocks, for example, #0_0 and #0_1 use the same frequency band, multiplexed information of the code block #0 does not have a frequency diversity effect. The frequency diversity effect refers to an effect preventing a signal loss caused by frequency fading by transmitting signals over different frequency bands.

In multiplexing control symbols indicating control information with data symbols, the following may be considered. Overwriting systematic symbols among data symbols with control symbols (control information) should not bring about a serious effect. Moreover, a start point of a cyclic buffer for a next redundancy version should not be influenced by presence/absence of control information. Since the systematic symbols may be lost due to overwriting by the control symbols, an error rate should be decreased. Further, in an HARQ transmission scheme, HARQ buffer corruption should be avoided.

In a method for mapping transmission data or code blocks to a physical transmission channel, the following may be considered when transmitting data including control information. If the number of code blocks is small, loss of systematic symbols should be prevented. Conversely, if the number of code blocks is large, systematic symbols or parity symbols which are lost in each code block should be dispersed and should be equally distributed. In FIG. 3, if the number of code blocks is small, lost systematic symbols or parity symbols concentrate in a specific code block and if the number of code blocks is large, loss of many symbols occurs in a specific code block, thereby degrading performance of a transmission system.

In multiplexing control symbols indicating control information with data symbols, the following may be considered. If one transport block is comprised of one or multiple divided blocks (code blocks) and is multiplexed together with the control information to satisfy a predetermined transmission capacity, the amount of data included in the code blocks is decreased according to the amount of control information to be multiplexed. At this time, data overwritten by the divided control information may not be evenly dispersed to multiple code blocks and may concentrate in a specific block or specific blocks. Namely, since the overwriting or rate-matching control information may not be evenly dispersed with respect to each code block, the performance of a transmission system may be degraded. The overwritten or rate-matched data may be comprised of systematic symbols and parity symbols, systematic symbols, or parity symbols. Here, rate matching is used as a concept opposite to overwriting. That is, to rate-match control information to data indicates that the control information is inserted between data information. According to the rate matching, the data is not lost by the control information.

DISCLOSURE

Technical Problem

An object of the present invention devised to solve the problem lies in providing a method for multiplexing data symbols and control symbols without losing systematic symbols and a method for arranging code blocks on a physical transmission channel so as to have a frequency diversity effect.

Technical Solution

The object of the present invention can be achieved by providing a method for multiplexing a control information stream, and a data information stream comprised of one or more systematic bit symbols and one or more non-systematic bit symbols. The method comprises mapping the data information stream to a resource area, so that the systematic bit symbols are not mapped to a specific resource area where the control information stream is to be mapped, and mapping the control information stream to the specific resource area. The non-systematic bit symbols may be parity symbols. The resource area may be a physical channel area comprised of a resource element of long term evolution (LTE) or a multiplexing block buffer within a multiplexing block in which a stream mapped to the physical channel area is multiplexed. Before the mapping the data information stream to a resource area, the one or more systematic bit symbols may be concatenated to each other and the one or more non-systematic bit symbols may be concatenated to each other, within the data information stream. The one or more systematic bit symbols and the one or more non-systematic bit symbols may be included in one or more code blocks generated from a transport block. The mapping the data information stream to a resource area may include mapping the non-systematic bit symbols to a first resource area including the specific resource area out of the resource area, and mapping the systematic bit symbols to a second resource area except for the first resource area out of the resource area by a predetermined method. The predetermined method may include relatively shifting at least a part of the systematic bit symbols within the second resource area by unit of determined symbols. The predetermined method may include changing an arrangement order of at least a part of the systematic bit symbols to a reverse order within the second resource area. The mapping the data information stream to a resource area and the mapping the control information stream to the specific resource area may be performed by a time first mapping method or a frequency first mapping method.

In another aspect of the present invention, provided herein is a method for multiplexing a data information stream and a control information stream in a wireless mobile communication system. The method comprises generating a plurality of code blocks each including one or more systematic bit symbols and one or more non-systematic bit symbols from a transport block, generating the data information stream by concatenating the code blocks, mapping the data information stream to a resource area, so that the systematic bit symbols of the data information stream are not mapped to a specific resource area where the control information stream is mapped, and mapping the control information stream to the specific resource area, wherein, in the code blocks of the generated data information stream, the one or more systematic bit symbols included in each code block are concatenated to each other and the one or more non-systematic bit symbols included in each code block are concatenated to each other. The mapping the data information stream to a resource area may include mapping the non-systematic bit symbols to a first resource area including the specific resource area out of the resource area, and mapping the systematic bit symbols to a second resource area except for the first resource area out of the resource area by a predetermined method. The predetermined method may include relatively shifting at least a part of the systematic bit symbols within the second resource area by unit of determined symbols. The predetermined method may include changing an arrangement order of at least a part of the systematic bit symbols to a reverse order within the second resource area. The mapping the data information stream to a resource area and the mapping the information symbol may be performed according to each code block, a part of the code blocks may be mapped by a predetermined order to a first slot within one subframe, and the other part of the code blocks may be mapped to a second slot within the one subframe by an order different from the predetermined order. The mapping the data information stream to a resource area and the mapping the control information stream to the specific resource area may be performed by a time first mapping method or a frequency first mapping method.

Advantageous Effects

According to a multiplexing method of the present invention, a degree of overwriting systematic symbols among data symbols by control symbols is reduced. A start point of a cyclic buffer for a subsequent redundancy version is not influenced by presence/absence of the control symbols. The systematic symbols might be lost due to overwriting by the control symbols but an error rate caused by loss of the systematic symbols is decreased. In an HARQ transmission scheme, HARQ buffer corruption may be avoided. In addition, according to a mapping method of the present invention, data loss concentrated in a specific code block caused by rate matching or overwriting of control information can be prevented with respect to code blocks or blocks configured in a series of orders.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 (b) illustrates a conventional multiplexing method for mapping data symbols, and control symbols indicating control information;

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings. The same reference numbers will be used throughout this specification to refer to the same or like parts.

Figure 4:
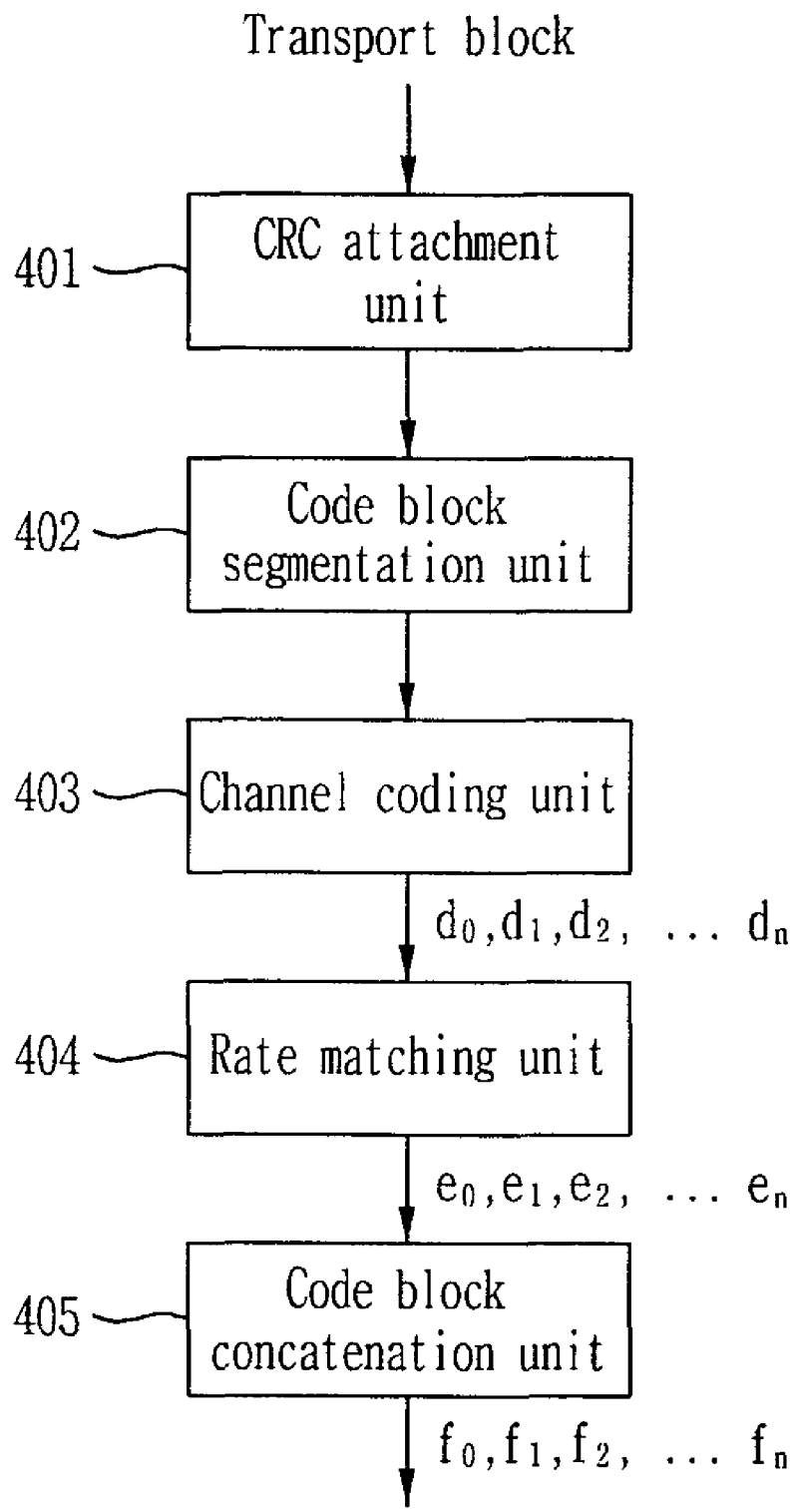
FIG. 4 illustrates a related embodiment of a transport channel processor of a wireless mobile communication system.

FIG. 4 illustrates a related embodiment of a transport channel processor of a wireless mobile communication system. In the transport channel processor, a transport block may be mapped to a physical transmission channel after passing through multiple units (processors).

Referring to FIG. 4, data of one transport block is input to a cyclic redundancy check (CRC) attachment unit 401 where a CRC code is attached. The CRC-attached transport block is segmented into one or more code blocks by a code block segmentation unit 402. The segmented code blocks are coded by a channel coding unit 403. The coded code blocks are punctured or repeated by a rate matching unit 404 according to the size of a physical transmission channel. The one or more rate-matched code blocks are concatenated by a code block concatenation unit 405, thereby forming data symbols to be input to a multiplexing block. The data symbols generated from the code block concatenation unit 405 may be mapped to the physical transmission channel. In actuality, 'data bits' may be generated from the code block concatenation unit 405 but hereinafter the term 'data symbols' will be used in consideration of a modulation order. The physical transmission channel may refer to an uplink shared channel, an uplink control channel, a broadcast channel, a downlink shared channel, a downlink control channel, a phasing channel, etc.

Although, in the exemplary embodiments and description of the present invention, a method for multiplexing 'data symbols' and 'control symbols' is explained, the present invention is not limited thereto and may be applied to methods for multiplexing two different types of symbols.

The present invention provides various methods which can prevent systematic symbols among data symbols from being lost when inserting or overwriting the systematic symbol by control symbols.

Data symbols related to TTI transmission are comprised of k redundancy versions. In each of the k redundancy versions, data symbols may be comprised of a combination of systematic symbols and parity symbols. The data symbols constructed by the k redundancy versions are configured by concatenating one or more code blocks. For example, the code block concatenation unit 405 shown in FIG. 4 may generate the data symbols by concatenating one or more code blocks. Concatenating the code blocks means that a set of systematic symbols and a set of parity symbols are configured by gathering the systematic symbols and parity symbols included in the respective code blocks. When generating sets of the systematic symbols and parity symbols, a predetermined method, which will be described later, may be used. In the present invention, control information may refer to an acknowledgement/negative acknowledgement (ACK/NACK), which is an HARQ response, and the ACK/NACK may overwrite data.

FIGS. 5 to 19 illustrate a multiplexing method according to exemplary embodiments of the present invention. In FIGS. 5, 8, 10, and 12, it is assumed that systematic symbols are included in index 0 to index 8 of a cyclic buffer and parity symbols are included in index 9 to index 11 of the cyclic buffer. It is also assumed that a control symbol is mapped to index RE5 of a multiplexing block buffer. The cyclic buffer may be replaced with any buffer which exists in a multiplexing processor of the wireless mobile communication system.

Figure 5:
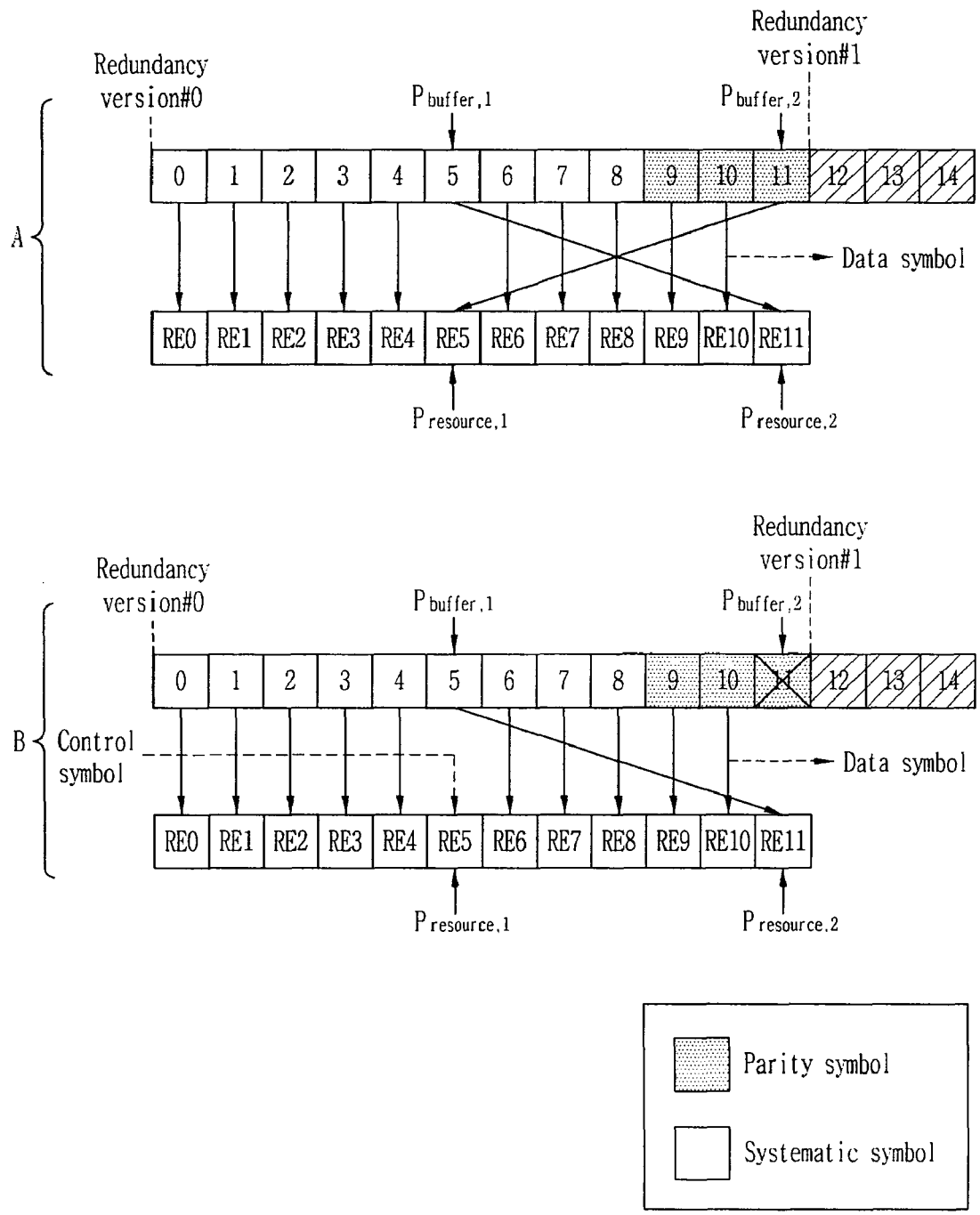
FIGS. 5 to 12 illustrate methods for multiplexing data symbols and control information according to exemplary embodiments of the present invention.
Figure 6:
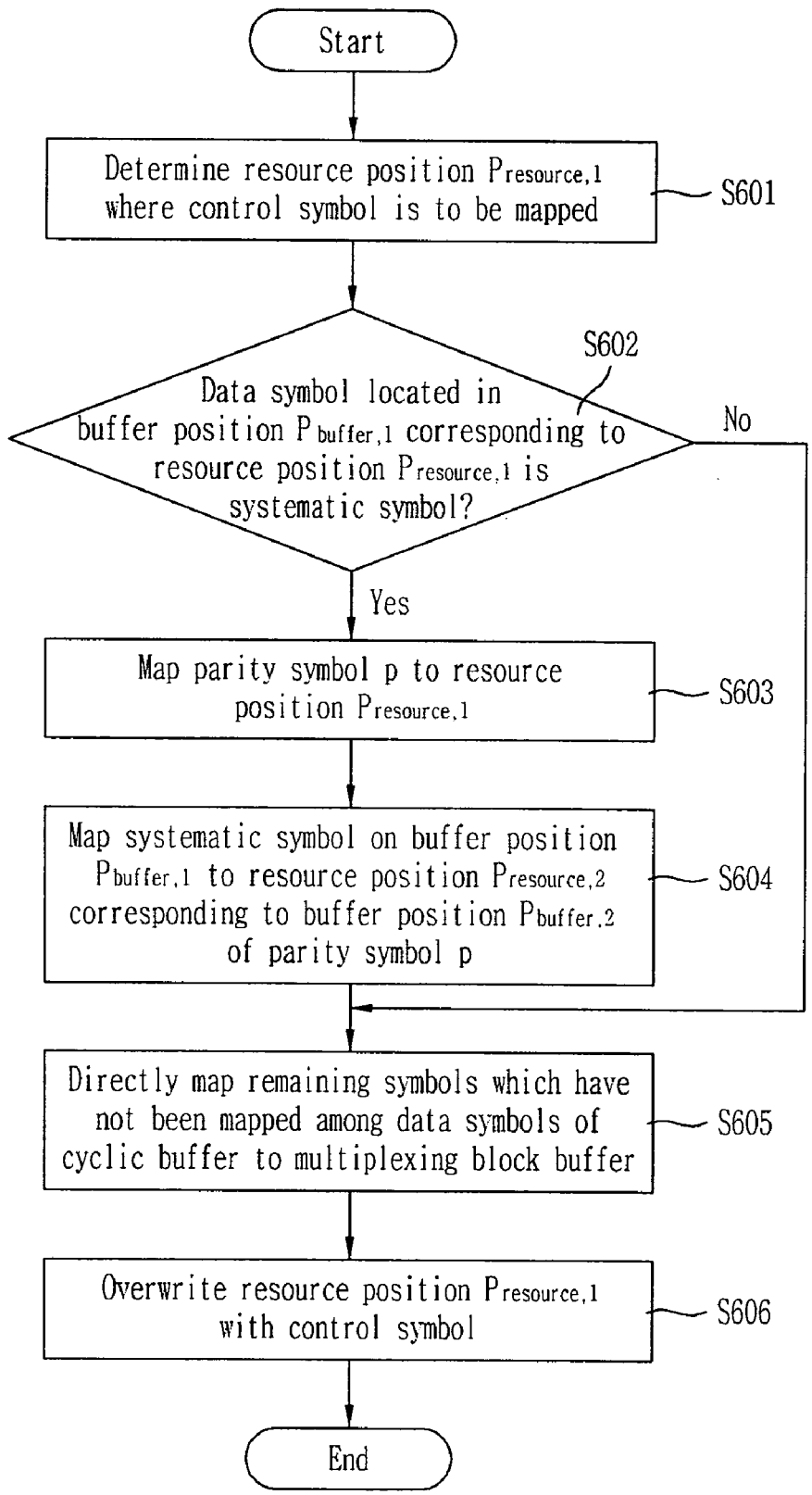
Figure 7:
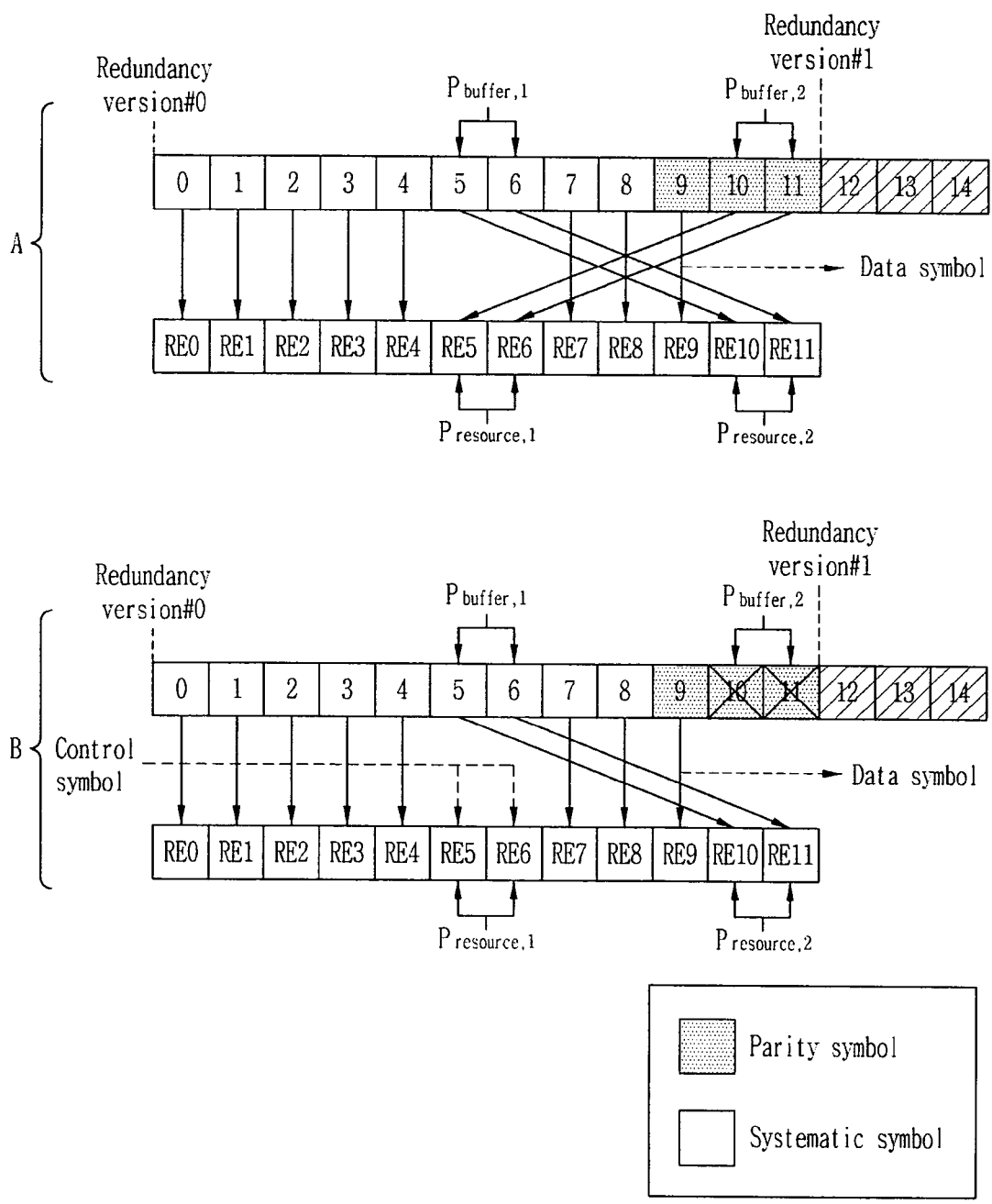

FIGS. 5 to 7 illustrate a multiplexing method according to an exemplary embodiment of the present invention.

Referring to FIG. 5, data symbols and control symbols are multiplexed through a series of processes.

First, a position of a multiplexing block buffer where a control symbol is to be mapped is determined. Each position of the multiplexing block buffer corresponds to each position of a physical transmission channel.

Next, as shown in A of FIG. 5, data symbols of index 0 to index 4 of a cyclic buffer and data symbols of index 6 to index 10 of the cyclic buffer are directly mapped to corresponding positions of the multiplexing block buffer. In more detail, the data symbols of index 0 to index 4 of the cyclic buffer are respectively mapped to index RE0 to RE4 of the multiplexing block buffer. The data symbols of index 6 to index 10 of the cyclic buffer are respectively mapped to index RE6 to RE10 of the multiplexing block buffer. Meanwhile, data symbols of index 5 and index 11 of the cyclic buffer are crossly mapped to the multiplexing block buffer. For example, the data symbol of the index 5 of the cyclic buffer is mapped to index RE11 of the multiplexing block buffer.

Thereafter, as shown in B of FIG. 5, a control symbol is mapped to a position of index RE5 of the multiplexing block buffer. It can be appreciated that the control symbol overwrites a parity symbol mapped from index 11 of the cyclic buffer but does not overwrite a systematic symbol existing on index 5 of the cyclic buffer.

FIG. 6 is a flow chart illustrating the method of the exemplary embodiment of FIG. 5.

The method of the exemplary embodiment of FIG. 5 may be expressed as the following steps.

In step S601, a resource position $P_{resource,1}$ where a control symbol is to be mapped is determined. In step S602, if a data symbol located in a buffer position $P_{buffer,1}$ corresponding to the determined resource position $P_{resource,1}$ is a systematic symbol, step S602 is followed by step S603, and if it is a parity symbol, step 602 proceeds to step S605. In step S603, a parity symbol p, which is a part of data symbols, is mapped to the resource position $P_{resource,1}$. In step S604, the systematic symbol on the buffer position $P_{buffer,1}$ among the data symbols is mapped to a resource position $P_{resource,2}$ corresponding to a buffer position $P_{buffer,2}$ of the parity symbol p. In step S605, the remaining symbols which have been not mapped among the data symbols are directly mapped to the multiplexing block buffer. In step S606, the control symbol is mapped to the resource position $P_{resource,1}$ by an overwriting method. It should be noted that when mapping the data symbols to the multiplexing block buffer in steps S604 and S605, the data symbols are mapped only to the empty positions of the multiplexing block buffer which have been not mapped yet.

In FIG. 5, a position overwritten by the control symbol is denoted as index RE5 of the multiplexing block buffer and a position of the data symbol to be overwritten is denoted as index 11 of the cyclic buffer. However, the position and number of the multiplexing block buffer overwritten by the control symbol may differ according to the position and number of the multiplexing block buffer to which data symbols which do not include systematic symbols are mapped. Even in this case, corresponding symbols are cross-mapped.

FIG. 7 illustrates a mapping method when control information is mapped to two resource elements. Even if the control information has a size of two or more symbols, the method shown in FIG. 7 may be extended to map the control information to resource elements.

Figure 8:
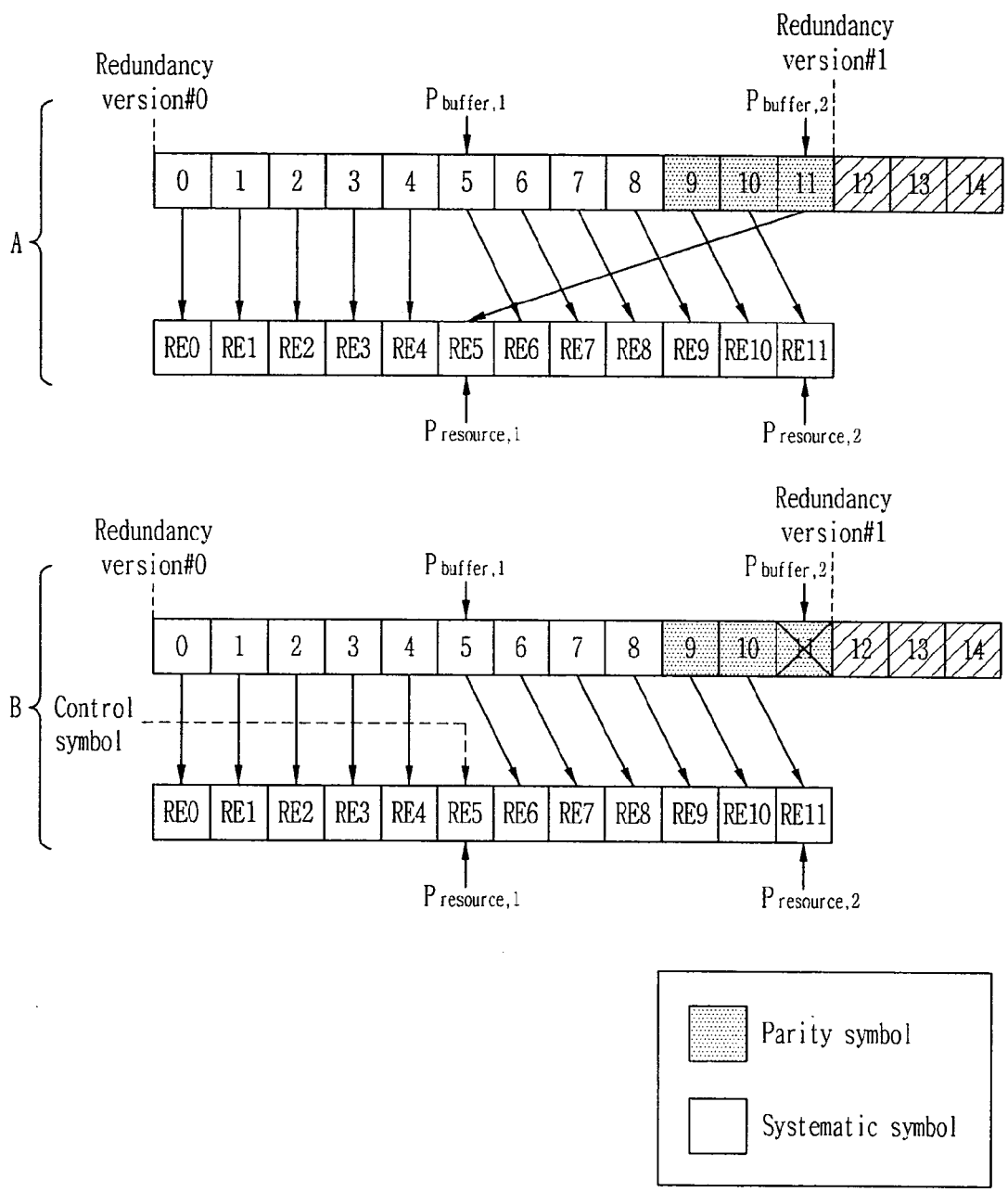
Figure 9:
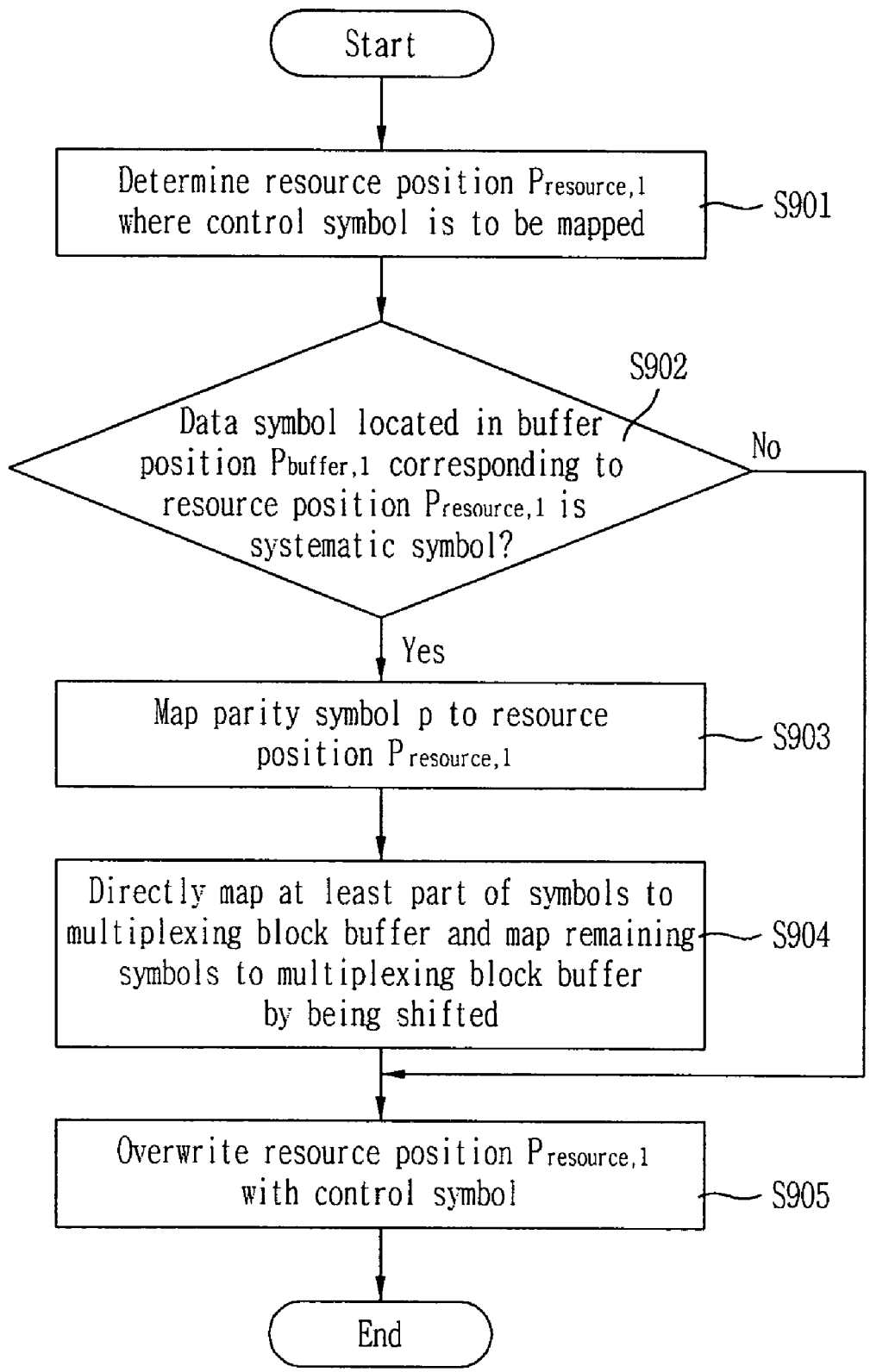

FIGS. 8 and 9 illustrate a multiplexing method according to another exemplary embodiment of the present invention.

Referring to FIG. 8, data symbols and a control symbol are multiplexed through a series of processes.

First, a position of a multiplexing block buffer where a control symbol is to be mapped is determined. Each position of the multiplexing block buffer corresponds to each position of a physical transmission channel.

Next, as shown in A of FIG. 8, data symbols of index 0 to index 4 of a cyclic buffer are directly mapped to respective positions of the multiplexing block buffer. A data symbol of index 11 of the cyclic buffer is mapped to index RE5 of the multiplexing block buffer. Data symbols of index 5 to index 10 of the cyclic buffer are respectively mapped to index RE6 to RE11 of the multiplexing block buffer by being shifted by as many as one index.

Thereafter, as shown in B of FIG. 8, a control symbol is mapped to a position of index RE5 of the multiplexing block buffer. It can be appreciated that the control symbol overwrites a parity symbol mapped from index 11 of the cyclic buffer but does not overwrite a systematic symbol mapped to index RE6 of the multiplexing block buffer from index 5 of the cyclic buffer.

FIG. 9 is a flow chart illustrating the method of the exemplary embodiment of FIG. 8.

The method of the exemplary embodiment of FIG. 8 may be expressed as the following steps.

In step S901, a resource position $P_{resource,1}$ where a control symbol is to be mapped is determined. In step S902, if a data symbol located in the buffer position $P_{buffer,1}$ corresponding to the determined resource position $P_{resource,1}$ is a systematic symbol, step S902 is followed by step S903, and if it is a parity symbol, step 902 proceeds to step S905. In step S903, a parity symbol p, which is a part of data symbols, is mapped to the resource position $P_{resource,1}$. In step S904, at least a part of symbols which have not been mapped among data symbols are directly mapped to the multiplexing block buffer and the remaining symbols which have not been mapped are mapped to the multiplexing block buffer by being shifted in symbol units. In step S905, the control symbol is mapped to the resource position $P_{resource,1}$ by an overwriting method. It should be noted that when mapping the data symbols to the multiplexing block buffer in step 904, the data symbols are mapped to only empty positions of the multiplexing block buffer which have not been mapped yet. The method shown in FIG. 6 is included in the method shown in FIG. 9.

In FIG. 8, a position overwritten by the control symbol is denoted as index RE5 of the multiplexing block buffer and a position of the data symbol to be overwritten is denoted as index 11 of the cyclic buffer. However, the position and number of the multiplexing block buffer overwritten by the control symbol may differ according to the position and number of the multiplexing block buffer to which data symbols which do not include systematic symbols are mapped. Even in this case, at least a part of corresponding symbols are mapped by being shifted in units of one or prescribed symbols.

Figure 10:
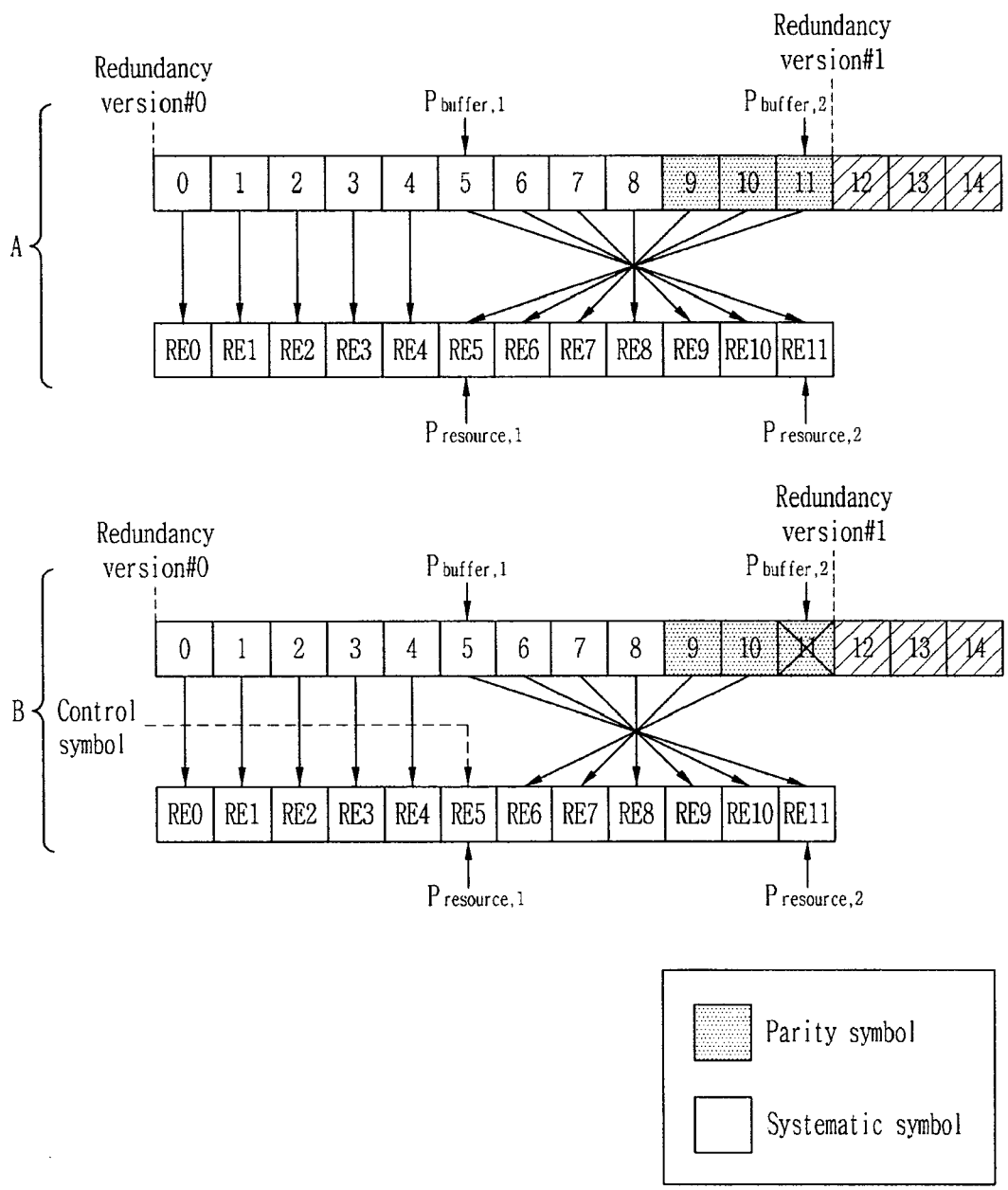
Figure 11:
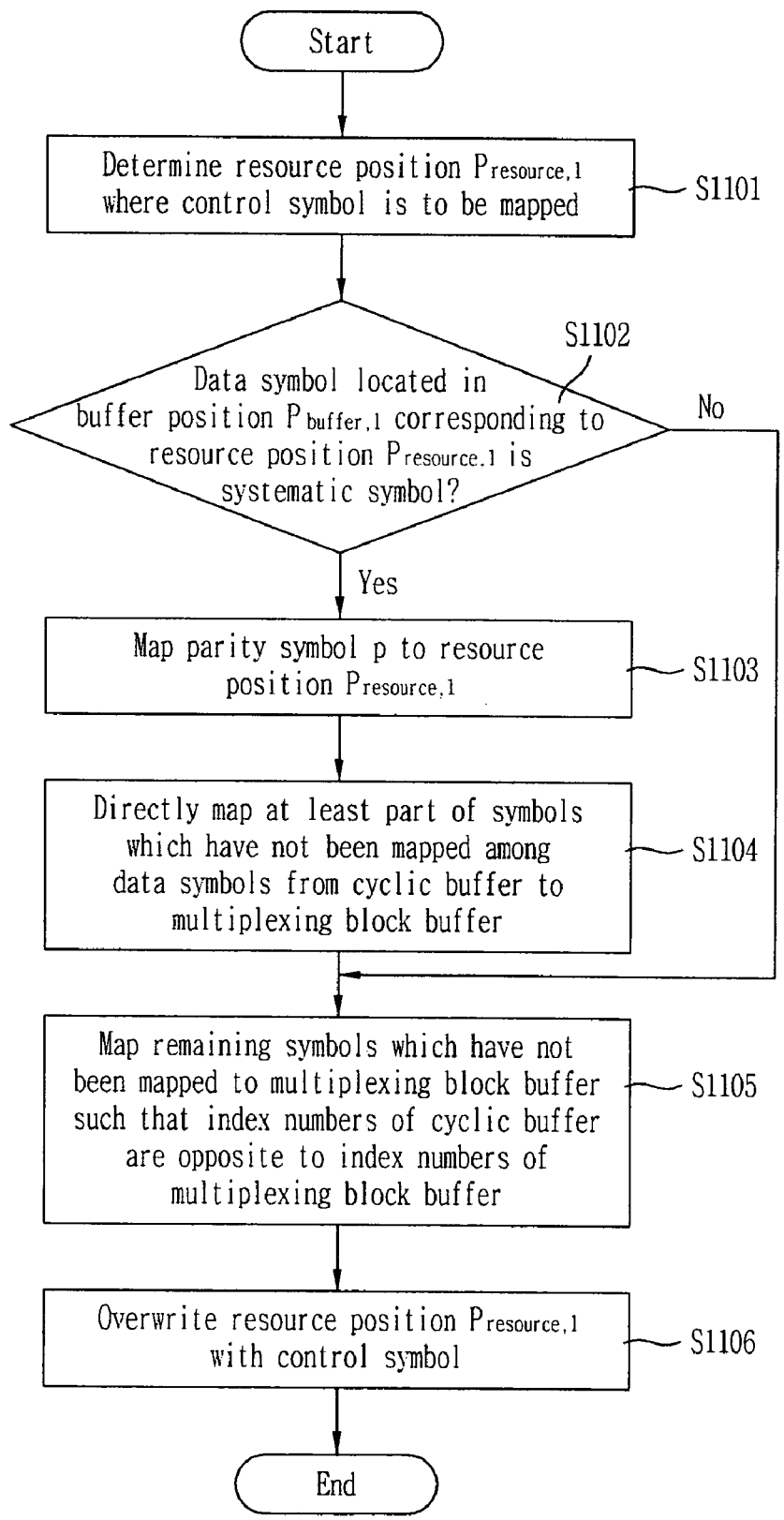

FIGS. 10 and 11 illustrate a multiplexing method according to still another exemplary embodiment of the present invention.

Referring to FIG. 10, data symbols and a control symbol are multiplexed through a series of processes.

First, a position of a multiplexing block buffer where a control symbol is to be mapped is determined.

Next, as shown in A of FIG. 10, data symbols of index 0 to index 4 of a cyclic buffer are directly mapped to a multiplexing block buffer. A data symbol of index 11 of the cyclic buffer is mapped to index RE5 of the multiplexing block buffer. Data symbols of index 5 to index 10 are mapped to index RE11 to RE6 of the multiplexing block buffer such that index numbers of the cyclic buffer are opposite to index numbers of the multiplexing block buffer as shown in FIG. 10.

Next, as shown in B of FIG. 10, the control symbol is mapped to a position of index RE5 of the multiplexing block buffer. It will be appreciated that the control symbol overwrites a parity symbol mapped from index 11 but does not overwrite a systematic symbol mapped to index RE11 of the multiplexing block buffer from index 5 of the cyclic buffer.

FIG. 11 is a flow chart illustrating the method of the exemplary embodiment of FIG. 10.

The method of the exemplary embodiment of FIG. 10 may be expressed as the following steps.

In step S1101, a resource position $P_{resource,1}$ where a control symbol is to be mapped is determined. In step S1102, if a data symbol located in the buffer position $P_{buffer,1}$ corresponding to the determined resource position $P_{resource,1}$ is a systematic symbol, step S1102 proceeds to step S1103, and if it is a parity symbol, step S1102 is followed by step S1104. In step S1103, a parity symbol p among data symbols is mapped to the resource position $P_{resource,1}$. In step S1104, at least a part of symbols which have not been mapped among data symbols are directly mapped to the multiplexing block buffer. In step S1105, remaining symbols which have not been mapped are mapped to the multiplexing block buffer such that index numbers of the cyclic buffer are opposite to index numbers of the multiplexing block buffer. In step S1106, the control symbol is mapped to the resource position $P_{resource,1}$ by an overwriting method. It should be noted that when mapping the data symbols to the multiplexing block buffer, the data symbols are mapped to only the empty positions of the multiplexing block buffer which have not been mapped yet.

In FIG. 10, a position overwritten by the control symbol is denoted as index 5 of the multiplexing block buffer and a position of the data symbol to be overwritten is denoted as index 11 of the cyclic buffer. However, the position and number of the multiplexing block buffer overwritten by the control symbol may differ according to the position and number of the multiplexing block buffer to which data symbols which do not include systematic symbols are mapped. Even in this case, at least a part of corresponding symbols are mapped to have opposite index numbers in units of one or prescribed symbols.

Figure 12:
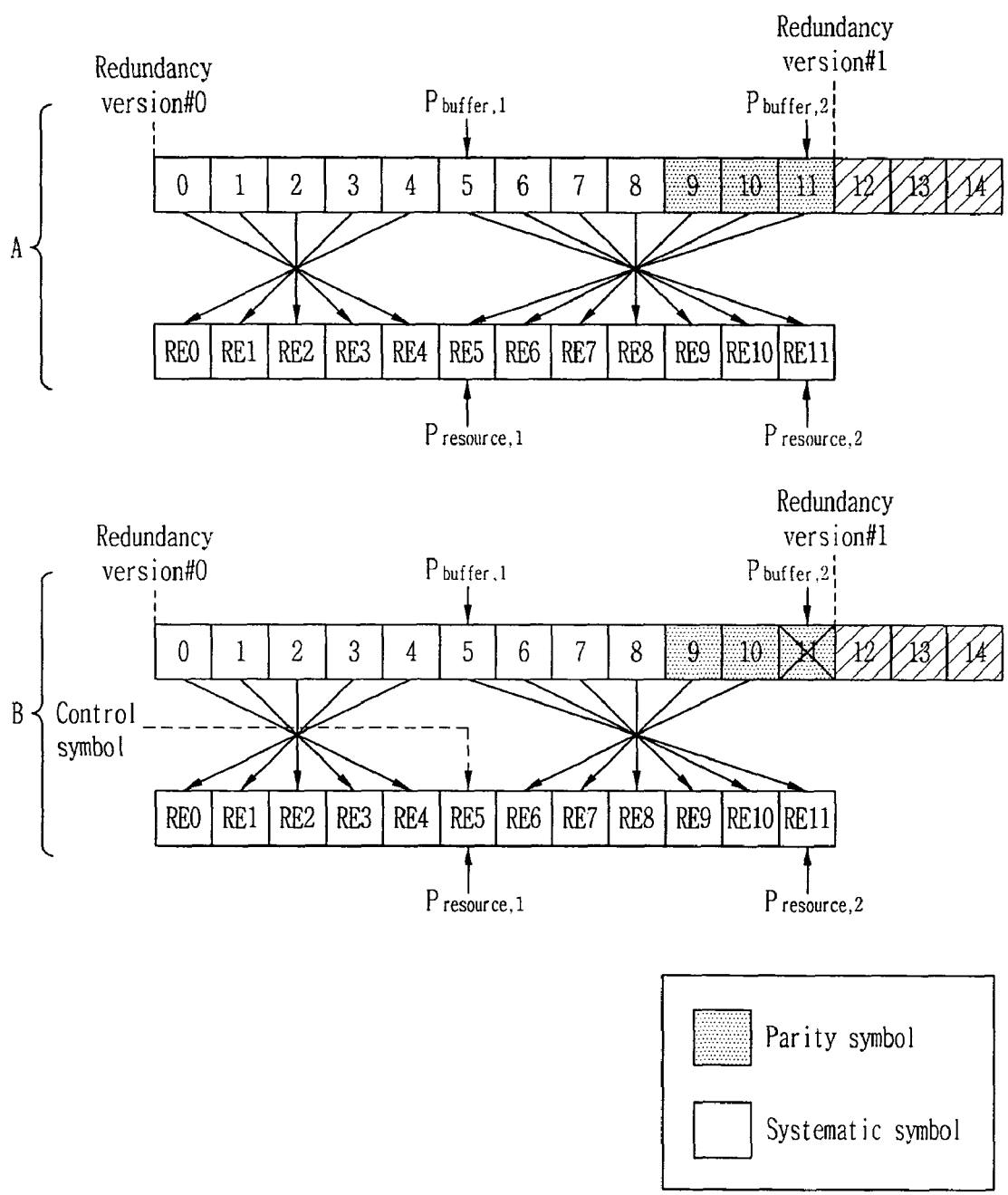

FIG. 12 illustrates a multiplexing method according to a further exemplary embodiment of the present invention.

FIG. 12 shows a modification of FIG. 10. In FIG. 12, other data symbols except for a parity symbol to be overwritten by a control symbol are not directly mapped to the multiplexing block buffer. The symbols except for the parity symbol may be classified into one or more groups and may be mapped such that index numbers of a cyclic buffer are opposite to index numbers of a multiplexing block buffer within each group as illustrated in FIG. 12.

In the exemplary embodiments of the present invention shown in FIGS. 5 to 12, although the control symbol is mapped to just one resource element, control symbols may be mapped to multiple resource elements. Then it will be readily understood that the above embodiments may be modified in various ways.

Although not shown, it is apparent that the control information may be mapped to two resource elements as in FIG. 7 with respect to the embodiments of FIGS. 8, 10, and 12. Further, the embodiments of FIGS. 5 to 12 may be modified such that the control information can be mapped to two or more resource elements.

In the embodiments of FIGS. 5 to 12, although the parity symbols are located on index 9 to index 11 of the cyclic buffer, it should be noted that the parity symbols may be dispersed on other positions. The above methods may be applied when the size of resources occupied by the control symbol is equal to or less than the size of resources occupied by the parity symbols among the data symbols. However, even when the size of resources occupied by the control symbol is greater than the size of resources occupied by the parity symbols among the data symbols, the above methods may be applied through modification. At this time, however, a part of systematic symbols among the data symbols may be overwritten by the control symbols and may be lost. The above-described effects of the present invention can be obtained by the above-described embodiments.

In the exemplary embodiments of the present invention described with reference to FIGS. 5 to 19, the systematic symbols and the parity symbols constituting the data symbols may be arranged in arbitrary order. It may be convenient if dispersed systematic symbols and parity symbols are gathered to construct data symbols as one 'set of systematic symbols' and one 'set of parity symbols'. That is, an algorithm can be simplified and the amount of operations can be decreased when actually embodying the present invention by arranging the symbols according to a type. Hereinafter, methods for arranging the systematic symbols and the parity symbols within the data symbols will be described.

Figure 13:
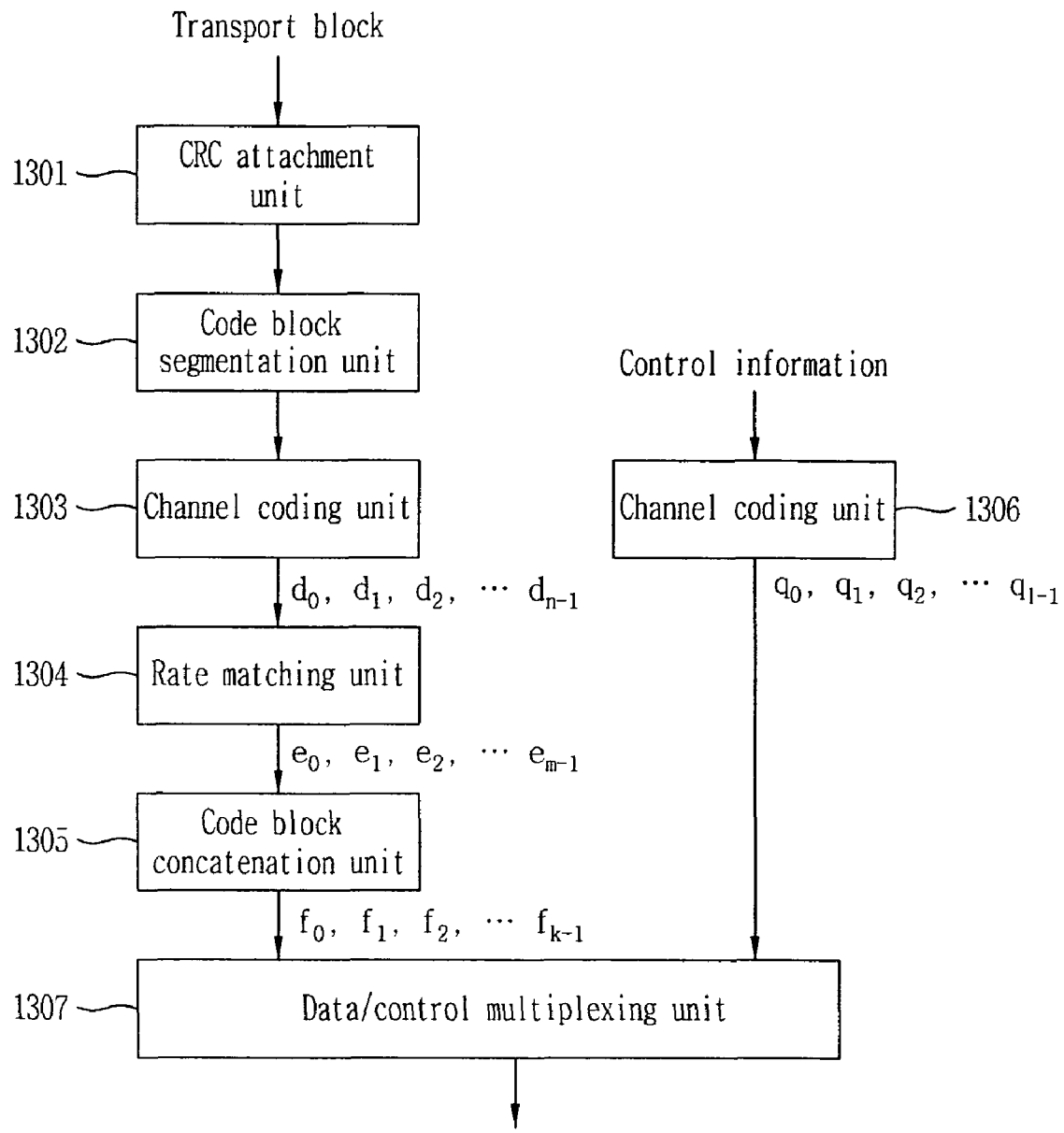
FIG. 13 illustrates a construction of a transport channel processor of a wireless mobile communication system.

FIG. 13 illustrates a construction of a transport channel processor of a wireless mobile communication system.

Referring to FIG. 13, data of one transport block is input to a CRC attachment unit 1301 where a CRC code is attached. The CRC-attached transport block is segmented into one or more code blocks by a code block segmentation unit 1302. The segmented code blocks are coded by a channel coding unit 1303. The coded code blocks are punctured or repeated by a rate matching unit 1304 according to the size of a physical transmission channel. The one or more rate-matched code blocks are concatenated by a code block concatenation unit 1305, thereby forming data symbols for the transport block data. The data symbols generated from the code block concatenation unit 1305 may be mapped to the physical transmission channel. A channel coding unit 1306 generates control symbols by coding control information. The control symbols generated from the channel coding unit 1306 and the data symbols are multiplexed by a data/control multiplexing unit 1307. Namely, the data/control multiplexing unit 1307 multiplexes the control symbols and data symbols.

The data symbols are generated through the code block concatenation unit 1305 and the control symbols are generated through the channel coding unit 1306. The generated data symbols and control symbols are multiplexed by the data/control multiplexing unit 1307. The multiplexed symbol stream is mapped to the physical transmission channel, thereby obtaining results of the embodiments of FIGS. 5 to 19.

The data symbols generated through the code block concatenation unit 1305 may be configured by one code block or by concatenation of two or more code blocks. Hereinafter, methods for collectively arranging the systematic symbols and parity symbols within the data symbols will be described with respect to the above-mentioned respective cases.

Figure 14:
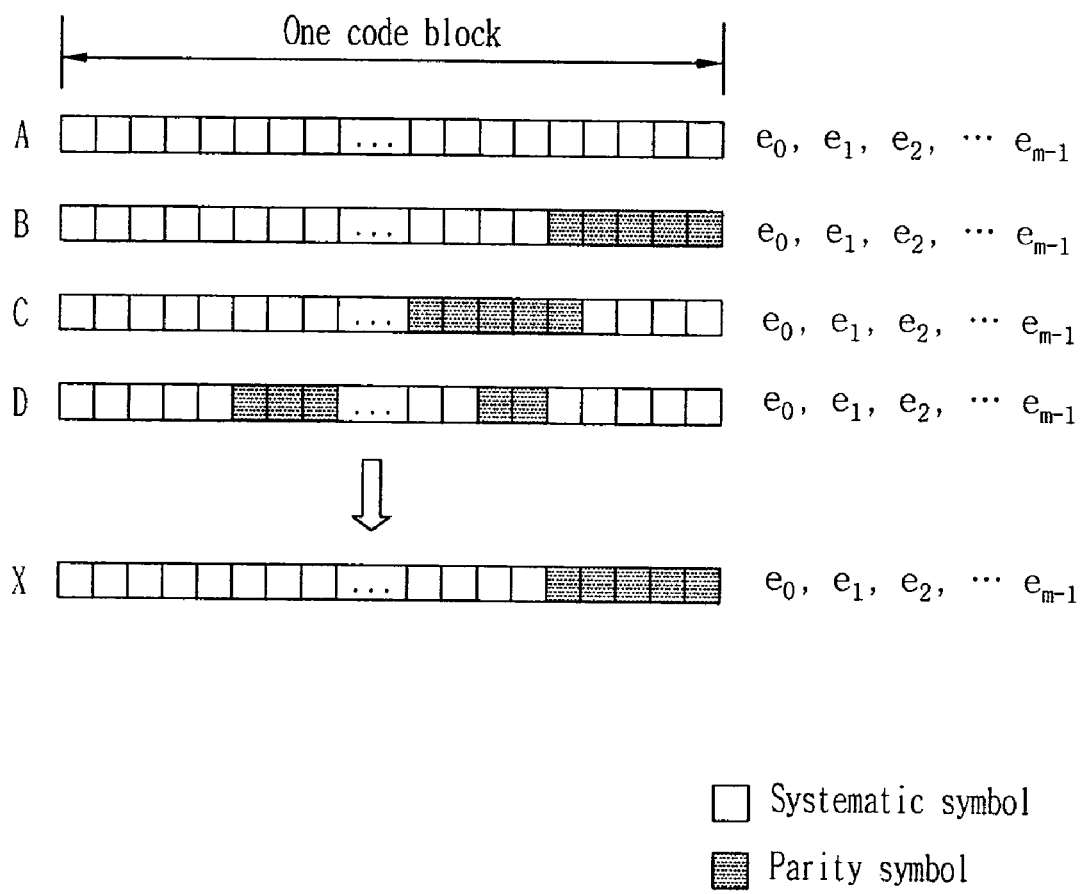
FIGS. 14, 15, and 16 illustrate methods for generating sets of systematic symbols and sets of parity symbols by separately collecting systematic symbols and parity symbols within data symbols according to exemplary embodiments of the present invention.

FIG. 14 illustrates one exemplary embodiment of a method for separately generating systematic symbols and parity symbols within data symbols as a set of systematic symbols and a set of parity symbols, respectively, when the data symbols generated through the code block concatenation unit 1305 are comprised of one code block.

In FIG. 14, a symbol stream $e_0, e_1, e_2, \ldots, e_{m-1}$ is generated from one code block. Here, the 'symbol stream' is the term considering a modulation order and may refer to a bit stream according to the modulation order. The symbol stream $e_0, e_1, e_2, \ldots, e_{m-1}$ is generated from the rate matching unit 1304 shown in FIG. 13. The symbol stream $e_0, e_1, e_2, \ldots, e_{m-1}$ has one of a configuration A comprised of systematic symbols, a configuration B comprised of systematic symbols and parity symbols, a configuration C comprised of systematic symbols, parity symbols, and systematic symbols, a configuration D comprised of systematic symbols, parity symbols, systematic symbols, and parity symbols, and a configuration E (not shown) repeating systematic symbols and parity symbols up to a prescribed length. Although the configurations A, B, C, D, and E are shown for the symbol stream $e_0, e_1, e_2, \ldots, e_{m-1}$, the same configurations may be applied to other symbol streams.

When data symbols are constructed with a set of systematic symbols, and a set of parity symbols followed by the set of systematic symbols, the embodiments of FIGS. 5 to 19 can be efficiently achieved. Namely, if the symbol stream $e_0, e_1, e_2, \ldots, e_{m-1}$ having various possible configurations, such as the configurations B, C, D, and E, is changed to a format of a configuration X shown in FIG. 14 and then is input to the data/control multiplexing unit 1307, an algorithm can be simplified and the amount of operations can be decreased when implementing the embodiments of FIGS. 5 to 19.

To this end, systematic symbols and parity symbols within the rate matching unit 1304 may be separately gathered such that the symbol stream $e_0, e_1, e_2, \ldots, e_{m-1}$ always has the configuration X. Alternatively, the order of a symbol stream $d_0, d_1, d_2, \ldots, d_{n-1}$ input to the rate matching unit 1304 may be changed such that the output of the rate matching unit 1304 always has the configuration X. Moreover, the output of the rate matching unit 1304 may have any one of the configurations A, B, C, D, and E and the code block concatenation unit 1305 may generate a symbol stream $f_0, f_1, f_2, f_{k-1}$ having the configuration X by separately gathering the systematic symbols and the parity symbols. In each of the above cases, start points and end points of the systematic symbols and the parity symbols for the symbol stream $e_0, e_1, e_2, \ldots, e_{m-1}$ may be considered and the length of the symbol stream $e_0, e_1, e_2, \ldots, e_{m-1}$ may be considered.

Figure 15:
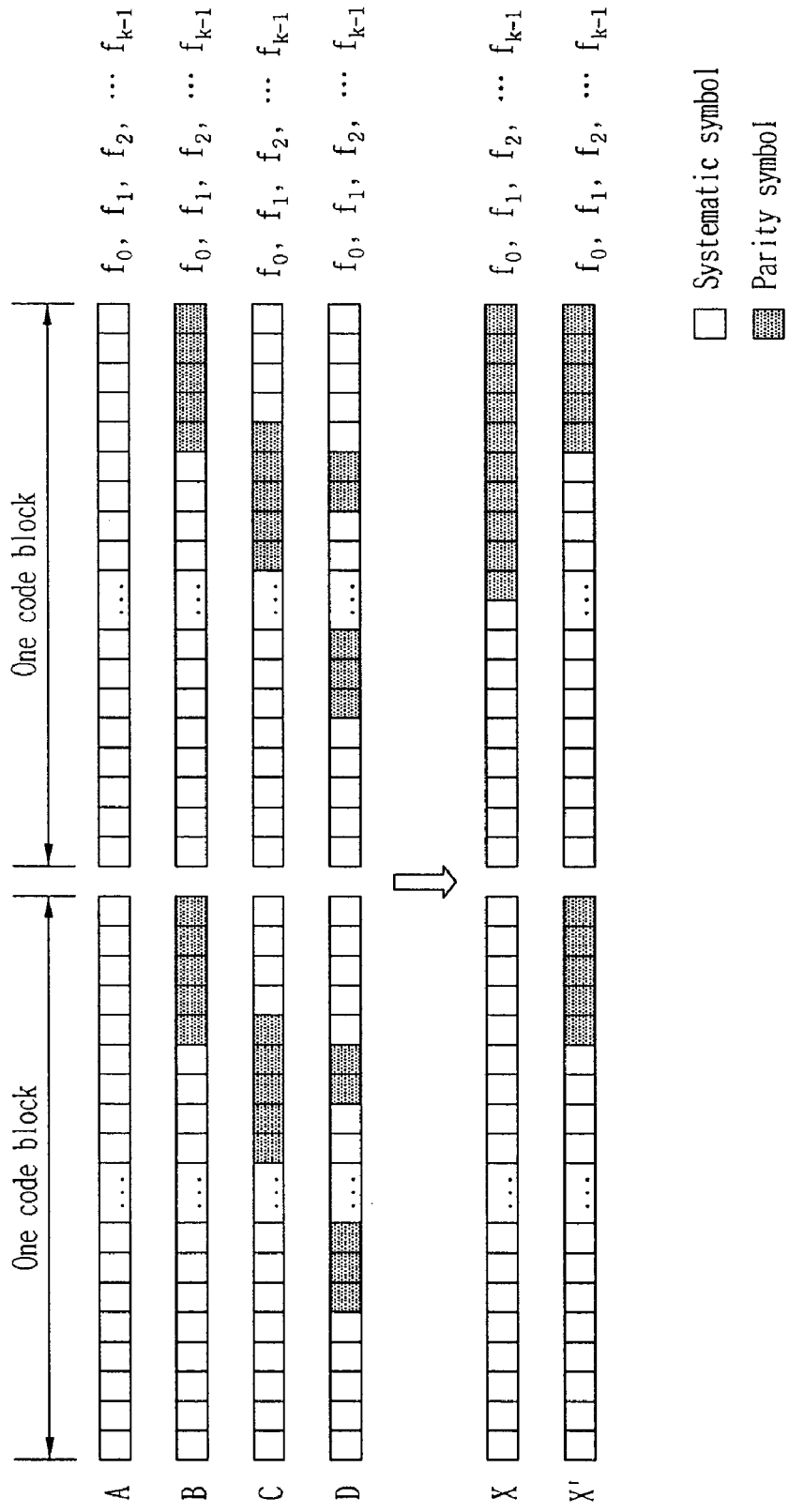

FIG. 15 illustrates one exemplary embodiment of a method for generating one or more sets of systematic symbols and one or more sets of parity symbols by separately gathering systematic symbols and parity symbols within data symbols, when the data symbols generated through the code block concatenation unit 1305 are comprised of two or more code blocks.

A symbol stream $f_0, f_1, f_2, \ldots, f_{k-1}$ shown in FIG. 15 is generated by concatenating two or more code blocks. This symbol stream is generated from the code block concatenation unit 1305 shown in FIG. 13 and has a construction in which a plurality of code blocks each having one of the configurations A, B, C, D, and E shown in FIG. 14 is concatenated.

When data symbols are constructed with one set of systematic symbols and one set of parity symbols followed by the set of systematic symbols, the embodiments of FIGS. 5 to 19 can be efficiently achieved. Namely, if the symbol stream $f_0, f_1, f_2, \ldots, f_{k-1}$ having various configurations, for example, the configurations B, C, D, and E shown in FIG. 15 is changed to a format of a configuration X shown in FIG. 15 and is input to the data/control multiplexing unit 1307, an algorithm can be simplified and the amount of operations can be decreased when achieving the embodiments of FIGS. 5 to 19.

To this end, systematic symbols and parity symbols may be separately gathered from two or more code blocks within the code block concatenation unit 1305 such that the symbol stream $f_0, f_1, f_2, \ldots, f_{k-1}$ always has the configuration X. Alternatively, the order of a symbol stream $e_0, e_1, e_2, \ldots, e_{m-1}$ of each code block input to the code block concatenation unit 1305 may be changed such that the output of the code block concatenation unit 1305 always has the configuration X.

Moreover, each code block within the data symbols generated by concatenating two or more code blocks (N code blocks) may be modified to have one set of systematic symbols and one set of parity symbols. It can be appreciated that the modified data symbols are comprised of N sets of systematic symbols and N sets of parity symbols. In this case, the modified data symbols have a configuration X'. Thus an algorithm can be simplified and the amount of operations can be decreased when achieving the embodiments of FIGS. 5 to 19 by simplifying a structure of the data symbols to be mapped to a physical transmission channel.

Although in the configurations X and X' shown in FIG. 15 the systematic symbols are generated first and the parity symbols are generated later, it is possible to generate the symbols in reverse order. When collectively gathering the systematic symbols and the parity symbols as a set of systematic symbols and a set of parity symbols, the systematic symbols may be generated first and the parity symbols may be generated later, or vice versa, in consideration of the size of the systematic and parity symbols to be constructed. The above method may be used for a virtual address method.

Equation 1 shown below represents a method for dividing a symbol stream $e_0, e_1, e_2, \ldots, e_{m-1}$ constructed by one code block into systematic symbols and parity symbols when using a turbo coder having a code rate of ⅓. In Equation 1, j is an offset indicating a bit position of the symbol stream $e_0, e_1, e_2, \ldots, e_{m-1}$ constructed by a code block and $k_0$ indicates a start point of systematic symbols during rate matching. Positions of a coded code block and a rate-matched code block may be corrected using j and $k_0$. An interval of systematic symbols and/or an interval of parity symbols can be obtained by rounding down a result of dividing $(j+k_0)$ by $k_\pi$. The systematic symbols and the parity symbols can be distinguished using the remainder of dividing, by 3, a value obtained by rounding down a result of dividing (j+k₀) by $k_\pi$.

$$\lfloor (j+k_0)/k_\pi \rfloor \% \ 3; \qquad \text{[Equation 1]}$$

where $\lfloor x \rfloor$ indicates rounding down of x.

Although in the method of FIG. 15 the output of the code block concatenation unit 1305 has the configuration X, it may have the configuration X'. Even if the output of the code block concatenation unit 1305 has the configuration X', the embodiments of the present invention described with reference to FIGS. 5 to 19 can decrease the amount of operations in the data/control multiplexing unit 1307.

The following Table 1 illustrates an embodiment applying the above-described method.

TABLE 1

```
set k = 0, r = 0, s = 0, p = 0
while r < C
    set j = 0
    while j < E_r
        if ⌊(j+k_0)/k_π⌋ % 3 == 0
            fs_s = e_rj
            s = s + 1
        else
            fp_p = e_rj
            p = p + 1
        end if
        j = j + 1
    end while
    r = r + 1
end while
j = 0
while j < s
    f_k = fs_j
    j = j + 1
    k = k + 1
end while
j = 0
while j < p
    f_k = fp_j
    j = j + 1
    k = k + 1
end while
```

Parameters used in Table 1 are as follows. C is the number of coded code blocks, $E_r$ is the length of an $r^{th}$ rate-matched code block, $k_0$ is a start point of systematic symbols during rate matching, $k_\pi$, is the length of systematic symbols and/or parity symbols of a coded code block before rate matching, $fs_x$ is a set of x systematic symbols, $e_{rj}$ is a jth bit of an rth coded and rate-matched code block, $f_{Px}$ is a set of x parity symbols, and $f_k$ is an output having k bits.

Figure 16:
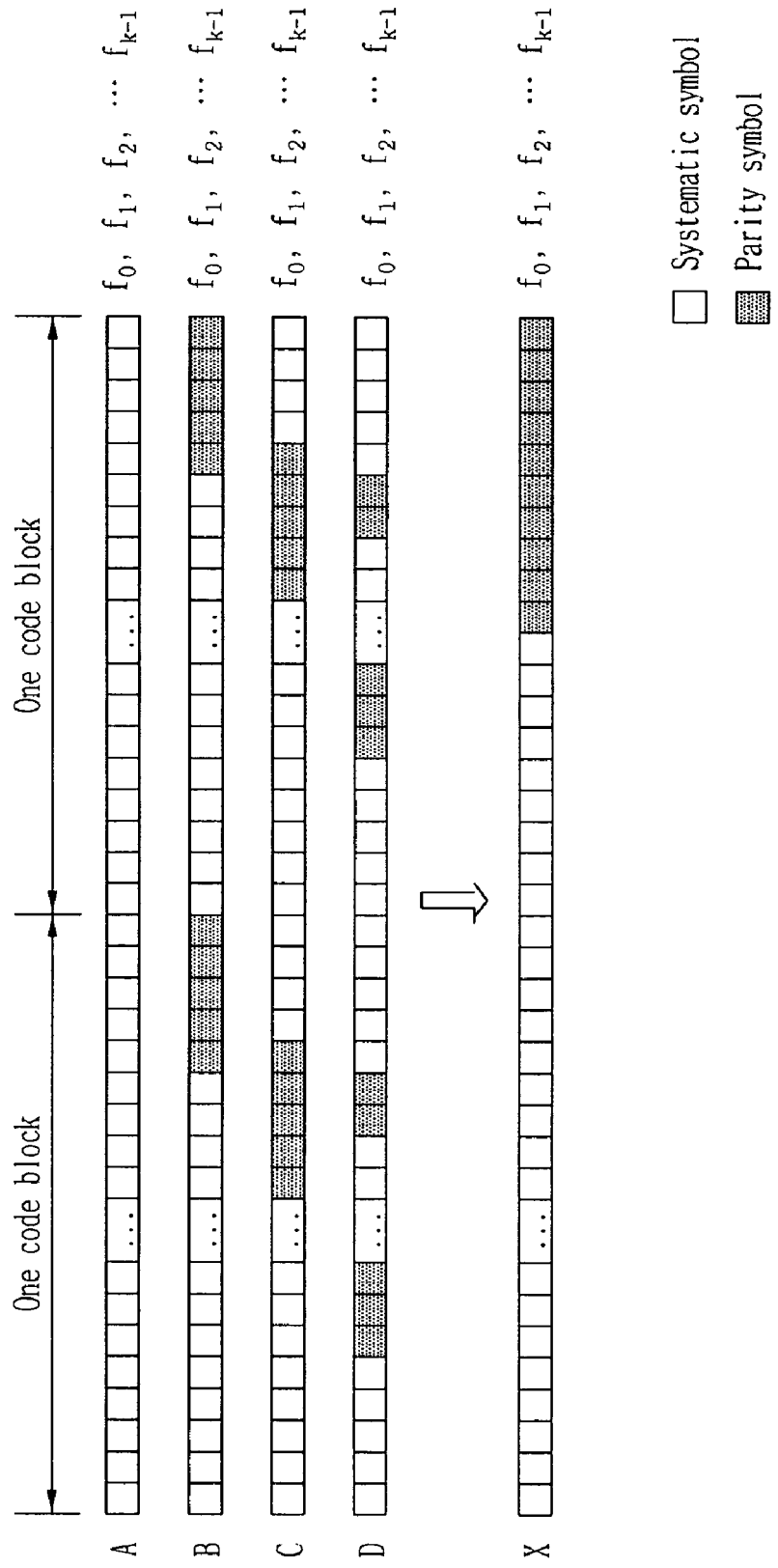

FIG. 16 illustrates another exemplary embodiment of a method for generating one set of systematic symbols and one set of parity symbol by separately gathering systematic symbols and parity symbols within data symbols when the data symbols generated through a code block concatenation unit are comprised of two or more code blocks.

In the method of FIG. 16, a symbol stream $f_0, f_1, f_2, \ldots, f_{k-1}$ may have one of configurations A, B, C, and D. According to the embodiment of FIG. 16, a process for generating a configuration X by separately gathering the symbol stream $f_0, f_1, f_2, \ldots, f_{k-1}$ having any configuration as systematic symbols and parity symbols is performed in or after the code block concatenation unit 1305.

To this end, the systematic symbols and parity symbols are separately gathered from two or more code blocks within the code block concatenation unit 1305 so that the symbol stream $f_0, f_1, f_2, \ldots, f_{k-1}$ may always have the configuration X. Alternatively, the order of a symbol stream $e_0, e_1, e_2, \ldots, e_{m-1}$ of each code block input to the code block concatenation unit 135 may be changed so that the output of the code block concatenation unit 1305 may always have the configuration X.

Although in the configuration X shown in FIG. 16 the systematic symbols are generated first and the parity symbols are generated later, it is possible to generate these symbols in reverse order. Further, the above method may use Equation 1 or may be employed for a virtual address method.

The following Table 2 illustrates an embodiment applying the above-described method.

TABLE 2

```
set k = 0, r = 0, s = 0, p = 0
while r < C
    set j = 0
    while j < (f_k/C)
        if ⌊(j+k_0)/k_π⌋ % 3 == 0
            fs_s = f_j
            s = s + 1
        else
            fp_p = f_j
            p = p + 1
        end if
        j = j + 1
    end while
    r = r + 1
end while
j = 0
while j < s
    f_k = fs_j
    j = j + 1
    k = k + 1
end while
j = 0
while j < p
    f_k = fp_j
    j = j + 1
    k = k + 1
end while
```

Parameters used in Table 1 are as follows. C is the number of coded code blocks, $f_k$ is multiple concatenated coded and rate-matched code blocks of k bits, $k_0$ is a start point of systematic symbols during rate matching, $k_r$, is the length of systematic symbols and/or parity symbols of a coded code block before rate matching, $fs_x$ is a set of x systematic symbols, $e_{rj}$ is a jth bit of an rth coded and rate-matched code block, $f_{Px}$ is a set of x parity symbols, and $f_k$ is an output having k bits.

The above-described methods may be used together or individually irrespective of constructions of a redundancy version and/or systematic symbols and parity symbols and may be used in the rate matching unit 1304, the code block concatenation unit 1305, and the data/control multiplexing unit 1307.

In the above-described embodiments, data loss caused due to overwriting with control information or due to rate matching is considered when transmission data is mapped to a physical transmission channel.

Figure 17:
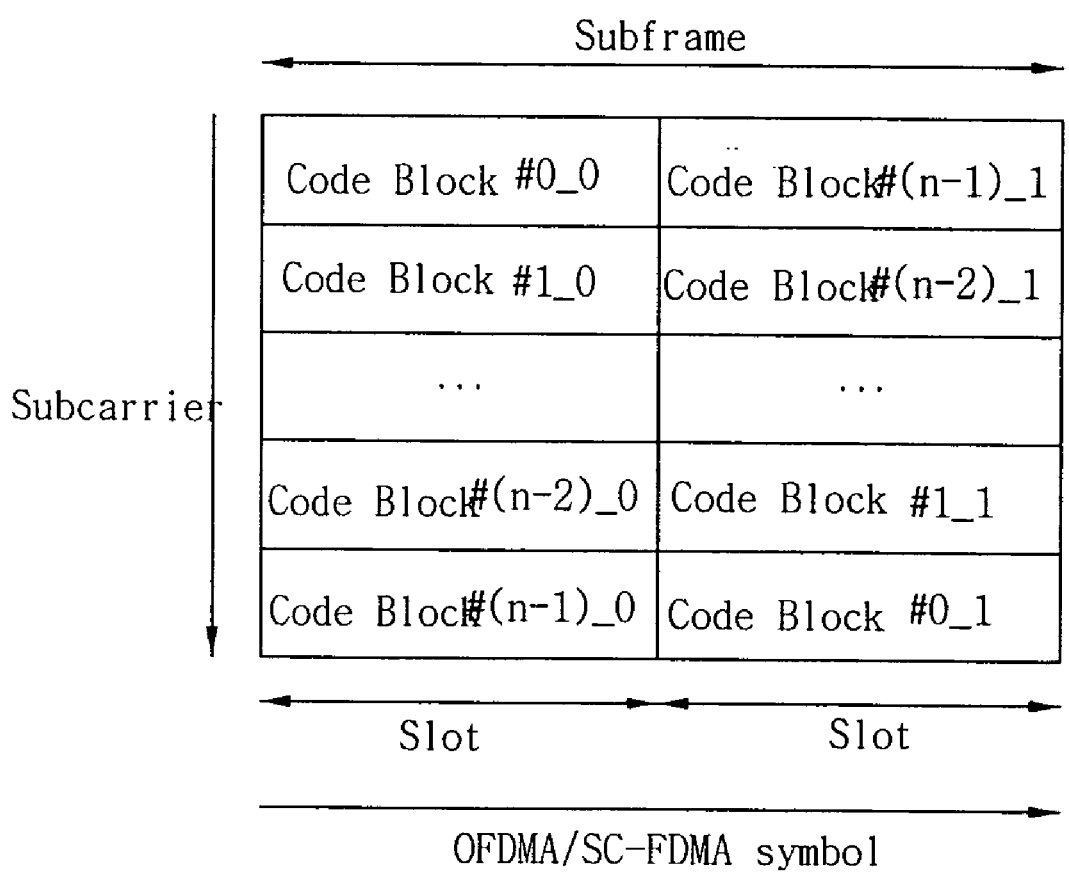
FIG. 17 illustrates an assignment order of code blocks within one subframe according to an exemplary embodiment of the present invention.

FIG. 17 illustrates an assignment order of code blocks within one subframe according to an exemplary embodiment of the present invention.

In FIG. 17, n code blocks are used. Each code block may be comprised of the output symbols generated from the data/control multiplexing unit shown in FIG. 13. One TTI is comprised of two slots. Each code block is divided into two blocks which are respectively mapped to the two slots. For example, code block #0_0 indicated in the first slot or code block #0_1 indicated in the second slot illustrates any one of two code blocks divided from one code block #0. As shown in FIG. 17, n code blocks are frequency-divided and mapped within one slot.

Referring to FIG. 17, an assignment order of code blocks in the first slot of the subframe is opposite to an assignment order in the second slot. The first slot is comprised of one or more code blocks which may be assigned thereto by an ascending, descending, or predetermined order according to code block numbers. That is, code blocks are assigned to the first slot in FIG. 17 in ascending order from #0_0 to #n_0. However, code blocks may be assigned in descending or arbitrary order. One or more code block numbers assigned to the second slot may have a different order from code block numbers assigned to the first slot. That is, the code blocks are assigned to the second slot in FIG. 17 in descending order from #n−1_1 to #0_1. Therefore, the code block numbers of the second slot are different from the code block numbers of the first slot. The length of one code block may be exactly the same as the time length of one slot as shown in FIG. 17. However, the length of one code block may be different from the time length of one slot.

Figure 18:
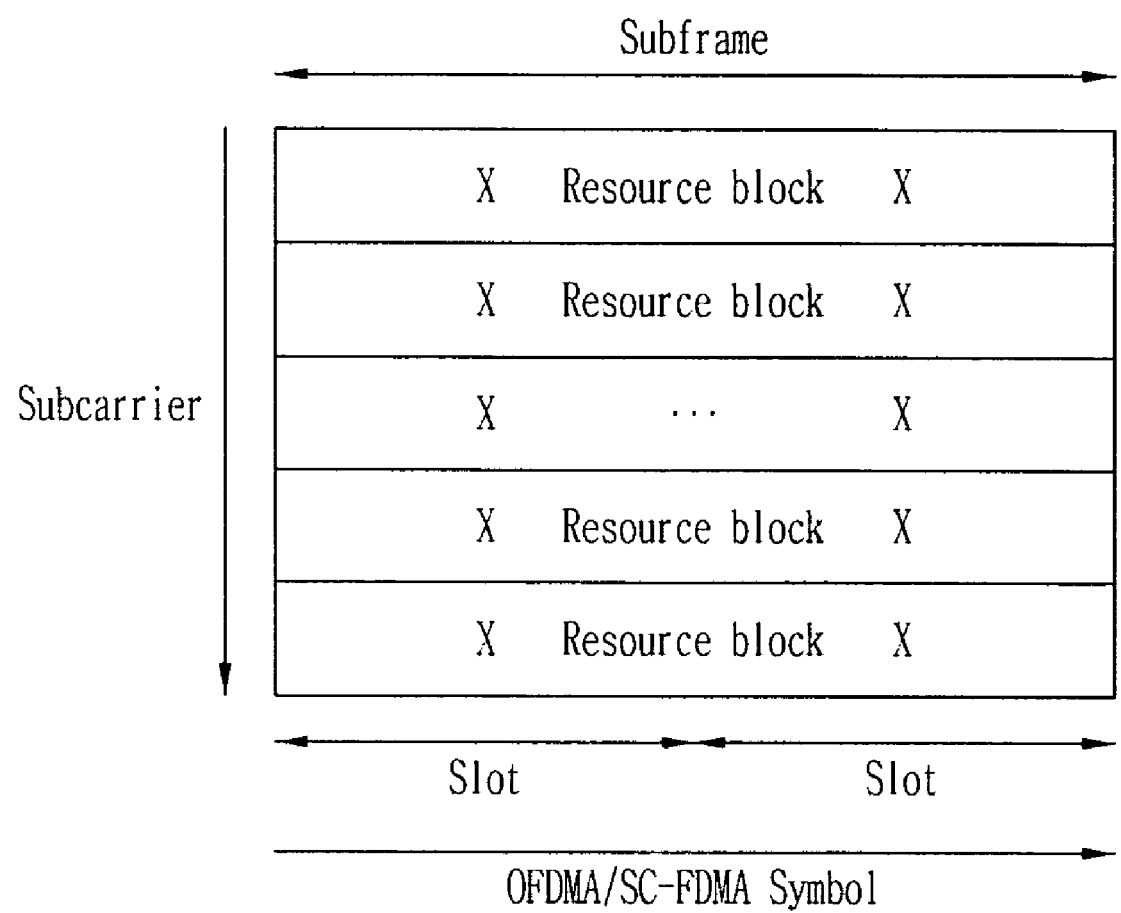
FIG. 18 illustrates a method for equally mapping control information according to a resource blocks to a physical transmission channel comprised of multiple resource blocks each having a constant size.

FIG. 18 illustrates a method for equally mapping control information according to a resource block to a physical transmission channel comprised of multiple resource blocks each having a constant size.

The physical transmission channel may be divided into units of a plurality of resource blocks each having a constant size. When determining a position into which control information is inserted or on which a part of rate-matched data is overwritten, a method for equally mapping the position according to a resource block is shown. In FIG. 18, although the number of resource blocks is 4, M resource blocks may be used. The resource block may be comprised of one or multiple code blocks. The number of control information which is inserted into M resource blocks, which is rate-matched, or which overwrites a part of data may be P. The number of segmented transport blocks (code blocks) to be mapped to the physical transmission channel may be C. Values obtained by dividing the number P of control information by the number M of resource blocks and by the number C of code blocks may be considered. That is, the number (P/M) of control information per resource block can be obtained by dividing the number P of control information by the number M of resource blocks. The number (P/M) of control information per resource block may be divided by the number C of code blocks existing in a corresponding resource block with respect to each resource block. Namely, the amount of rate-matching or overwriting control information per code block may vary according to the size and number of code blocks. When inserting, rate-matching or overwriting the control information, the above-described method may be used to equally arrange the control information for respective resource blocks or code blocks.

Figure 19:
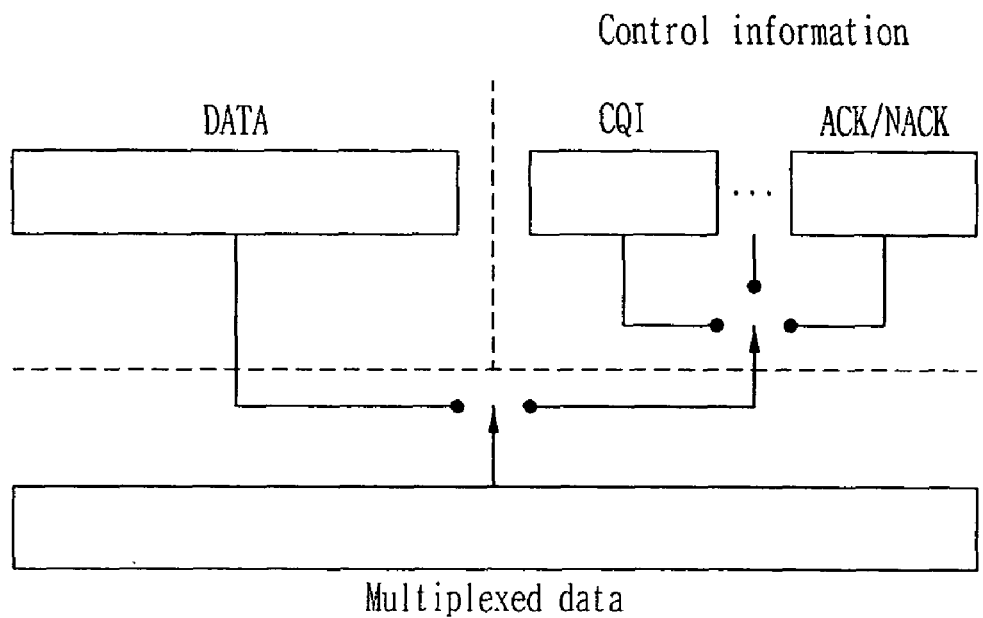
FIGS. 19 (a) and (b) illustrate methods for multiplexing control information and data according to exemplary embodiments of the present invention.
Figure 19:
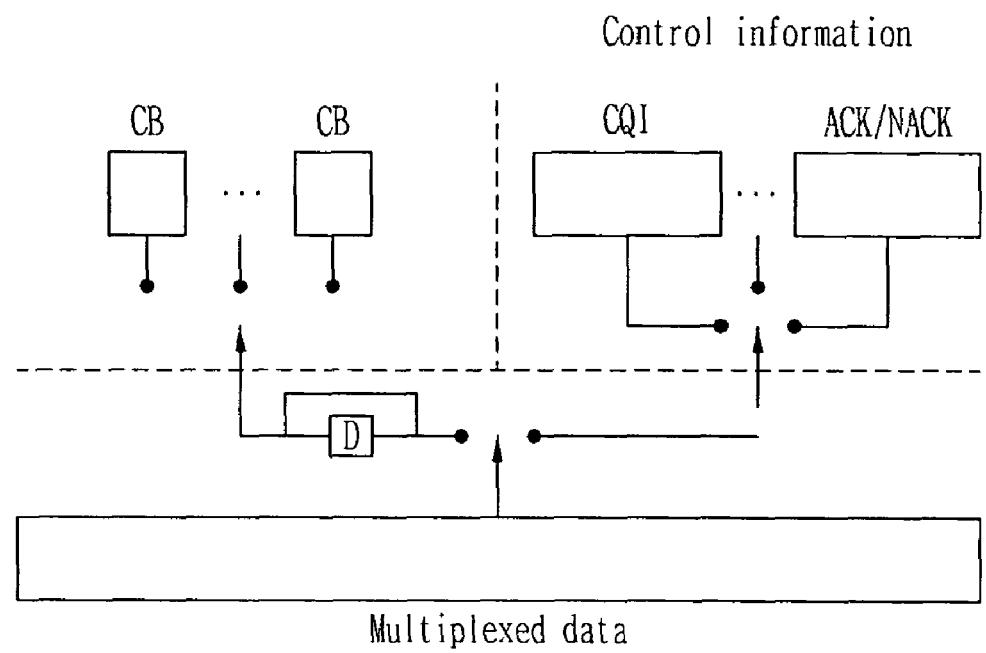

FIGS. 19 (a) and (b) illustrate methods for multiplexing control information and data according to an exemplary embodiment of the present invention.

Referring to FIG. 19 (a), a symbol stream $f_0, f_1, f_2, \ldots, f_{k-1}$, which is input to, for example, the data/control multiplexing unit 1307 shown in FIG. 13, may be multiplexed with a symbol stream $q_0, q_1, q_2, \ldots, q_{l-1}$ which is generated by channel-coding control information such as a channel quality indicator (CQI) and an ACK/NACK. The control information is determined to be input to a specific position of a multiplexing block buffer and then the symbol streams $f_0, f_1, f_2, \ldots, f_{k-1}$ and $q_0, q_1, q_2, \ldots, q_{l-1}$, may be alternately input to the data/control multiplexing unit 1307 so that the control information is mapped to the specific position. Through such a method, the multiplexed data may include both data symbols and control symbols. Moreover, the control information may exist on the specific position of the multiplexed data. Through the above-described method, data can be multiplexed irrespective of presence/absence of control information and the size and number of control information.

The method of FIG. 19 (b) may be achieved in the data/control multiplexing unit. A transport data block may be comprised of one or more code blocks (CBs). When the transport data block is multiplexed with the control information, the transport data block and the control information may be alternately multiplexed and multiple code blocks and the control information may be alternately multiplexed.

If the control information is inserted by a delay or buffer D, input information is temporally buffered when the transport data blocks or code blocks are sequentially input, thereby inserting the control information without losing the data blocks or the code blocks. When the control information overwrites a part of the data blocks or code blocks, the control information may be located on partial positions of the transport data blocks or code blocks by processing the blocks without buffering. Both the code block CB and the delay D shown in FIG. 19 (b) may be used or one thereof may be used. The data information and the control information may be multiplexed sequentially or in reverse order or in a predetermined order. The data and control information may be processed in units of bits, or units of symbols according to a modulation scheme.

Figure 1:
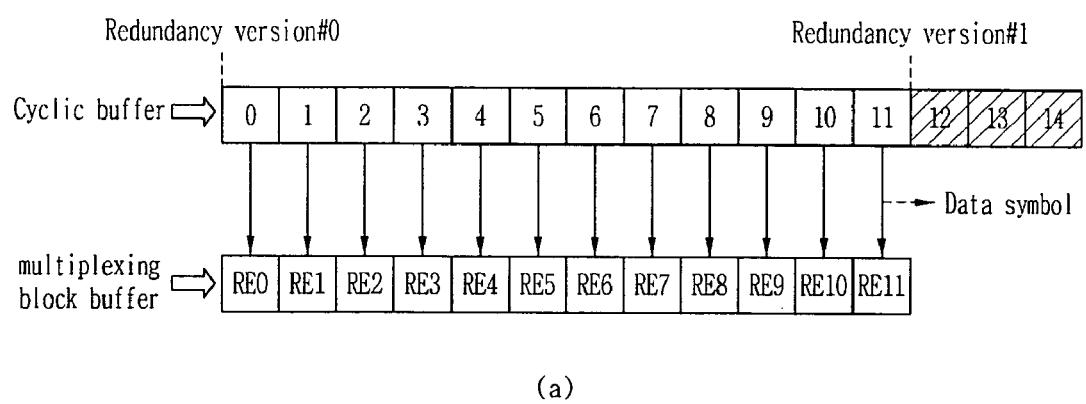
FIG. 1 (a) illustrates a conventional method for mapping data symbols to resource elements of a physical transmission channel.
Figure 1:
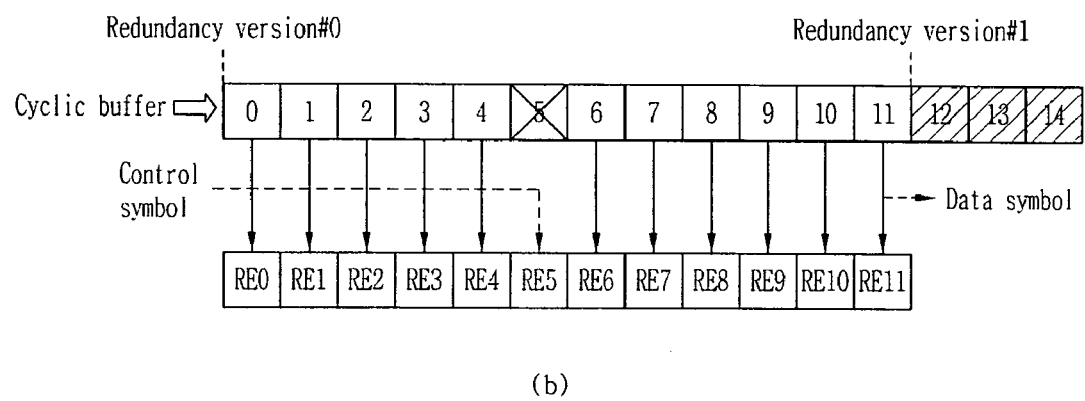
Figure 2:
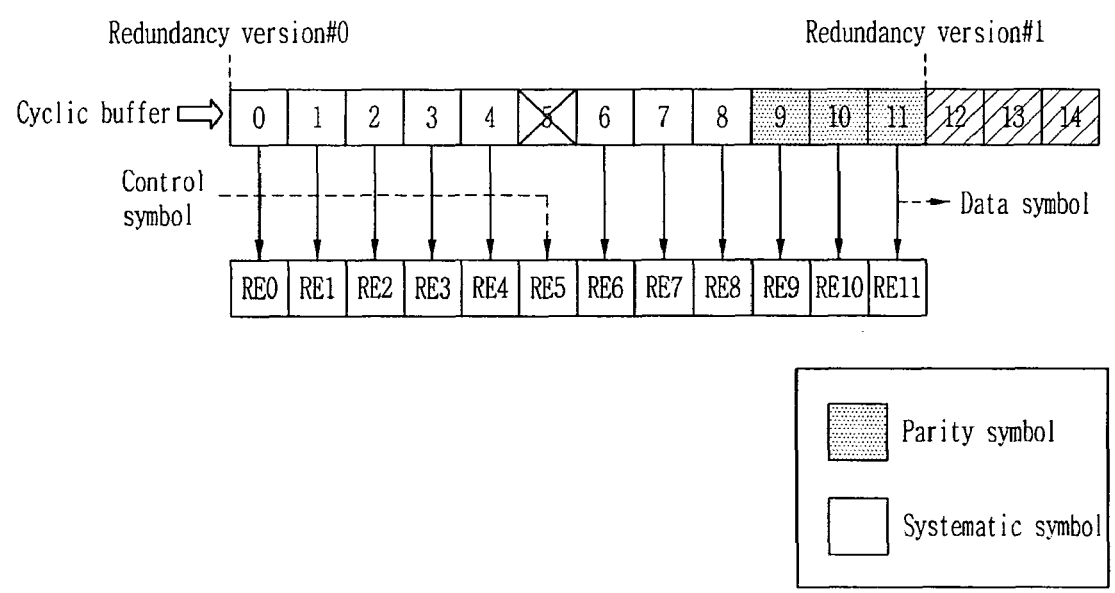
FIG. 2 illustrates a phenomenon in which a part of data symbols are lost by the method shown in FIG. 1 (b)
Figure 3:
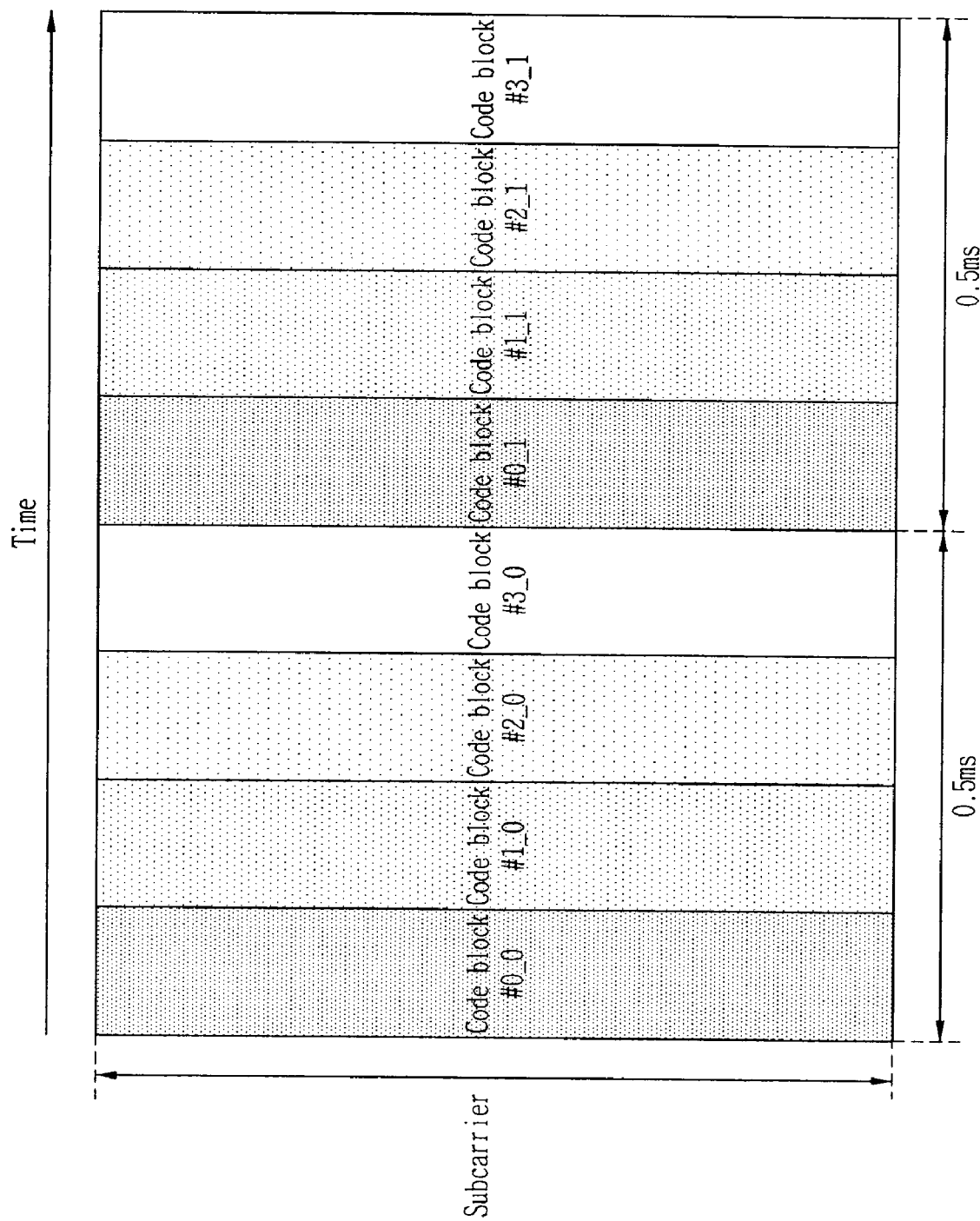
FIG. 3 illustrates a conventional structure in which code blocks for transmission transmit are mapped to a physical transmission channel.
Figure 20:
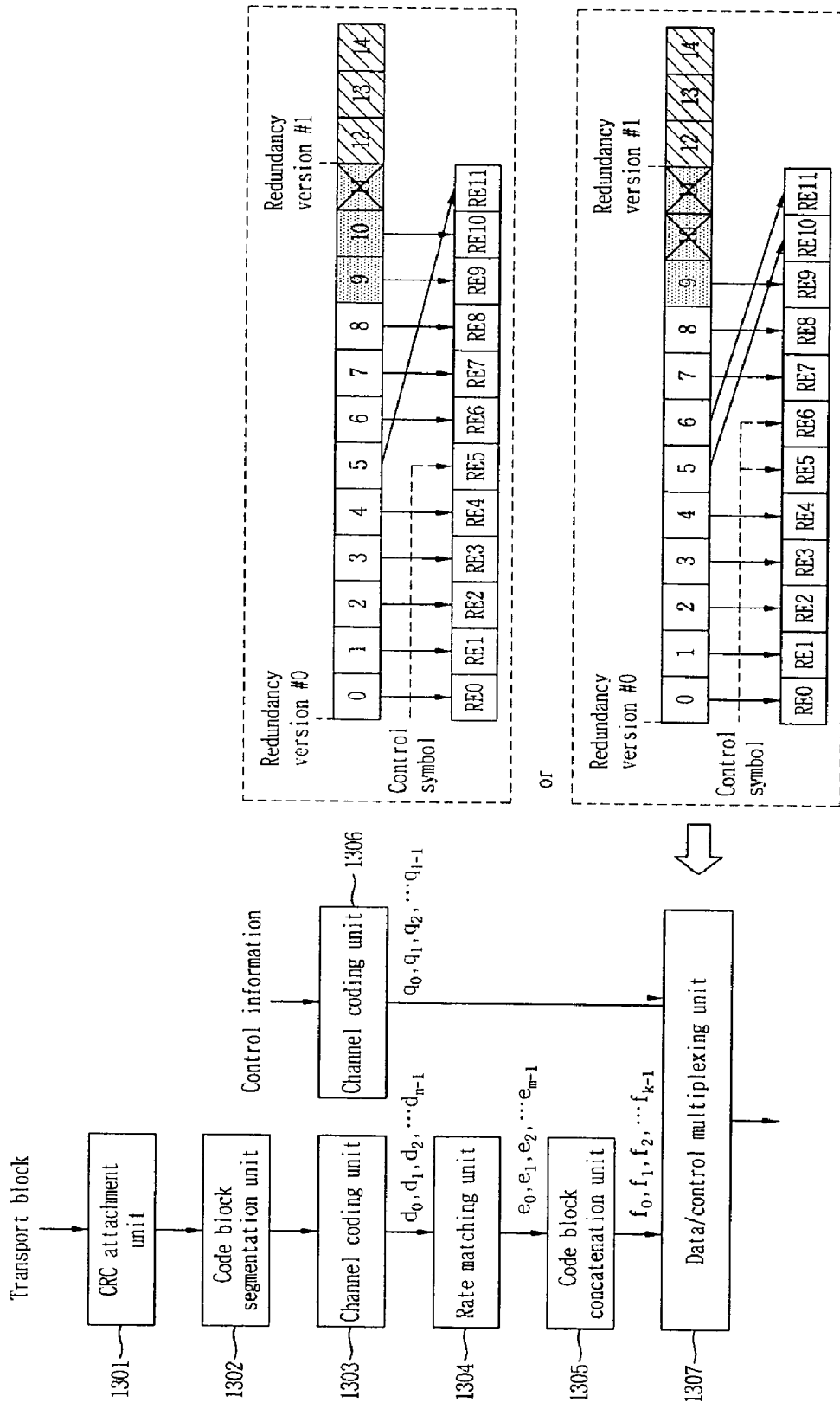
FIG. 20 illustrates an exemplary embodiment applying the multiplexing method of FIG. 5 or 7 to 3GPP TS 36.212 V8.0.0.

FIG. 20 illustrates an exemplary embodiment applying the multiplexing method of FIG. 5 or 7 to 3GPP TS 36.212 V8.0.0.

Referring to FIG. 20, the multiplexing method of FIG. 5 or 7 is applied to the transport channel processor of the wireless mobile communication system of FIG. 13. A construction shown in the left side of FIG. 20 is the same as the construction of FIG. 13. Control information, which is an ACK/NACK of a HARQ response, passes through a channel coding unit and is generated as a control symbol stream $q_0, q_1, q_2, \ldots, q_{l-1}$. The control symbol stream $q_0, q_1, q_2, \ldots, q_{l-1}$ is input to a data/control multiplexing unit. The data/control multiplexing unit generates a multiplexed symbol stream using a data symbol stream $f_0, f_1, f_2, \ldots, f_{k-1}$ and the control symbol stream $q_0, q_1, q_2, \ldots, q_{l-1}$.

A construction shown in the right, lower side of FIG. 20 is an example of applying the method of FIG. 7 to multiplex two of control information. When two or more code blocks are generated from a transport block, a code block concatenation unit or the data/control multiplexing unit concatenates two or more code blocks. To support the multiplexing methods of FIGS. 5 to 19, the code block concatenation unit or the data/control multiplexing unit separately collect systematic symbols and parity symbols of data symbols. The multiplexing methods and functions for concatenating the code blocks according to the present invention may be applied to a transport block configured through ordering and mapping processes of a memory address based on a virtual (or actual) memory address.

Figure 21:
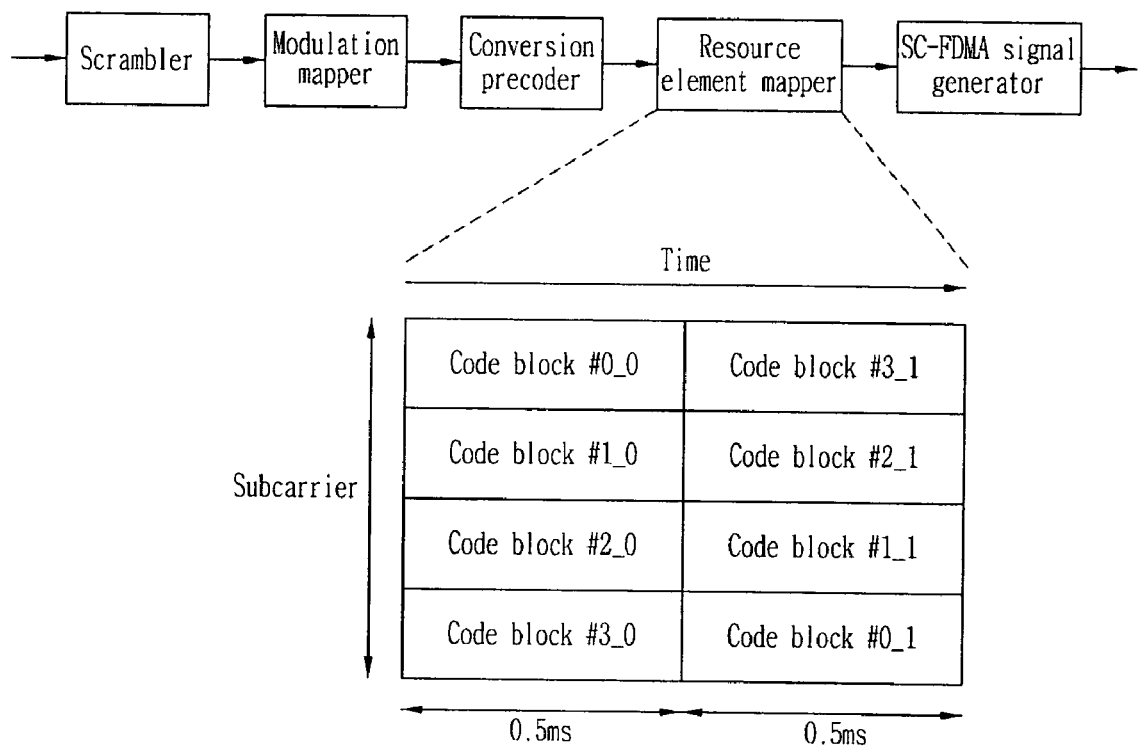
FIG. 21 illustrates an exemplary embodiment applying the method of FIG. 17 to 3GPP TS 36.212 V8.0.0.

FIG. 21 illustrates an exemplary embodiment applying the method of FIG. 17 to 3GPP TS 36.212 V8.0.0.

Referring to FIG. 21, a process for converting data, or control information and multiplexed data into a single carrier-frequency division multiple access (SC-FDMA) signal is shown. A resource element mapper may map an input symbol stream to a physical transport channel using the method of FIG. 17. In FIG. 21, 4 code blocks are assumed. In the first slot, code blocks from #0_0 to #3_0 may be arranged by frequency division. In the second slot, code blocks from #3_1 to #0_1 may be arranged in reverse order of the first slot. For example, if the first slot has code blocks arranged in the order of #0_0, #1_0, #2_0, and #3_0, the second slot has code blocks arranged in the order of #3_1, #2_1, #1_1, #0_1. Here, code blocks #i_0 and #i_1 are split from code block #i. The length of one code block is the same as the time length of one slot. However, if they are not equal, a next code block may be successively located after one code block. The code block may be located at a randomly designated position. A block expressed by a code block may be a code block, or a block comprised of a set of systematic symbols and parity symbols.

Figure 22:
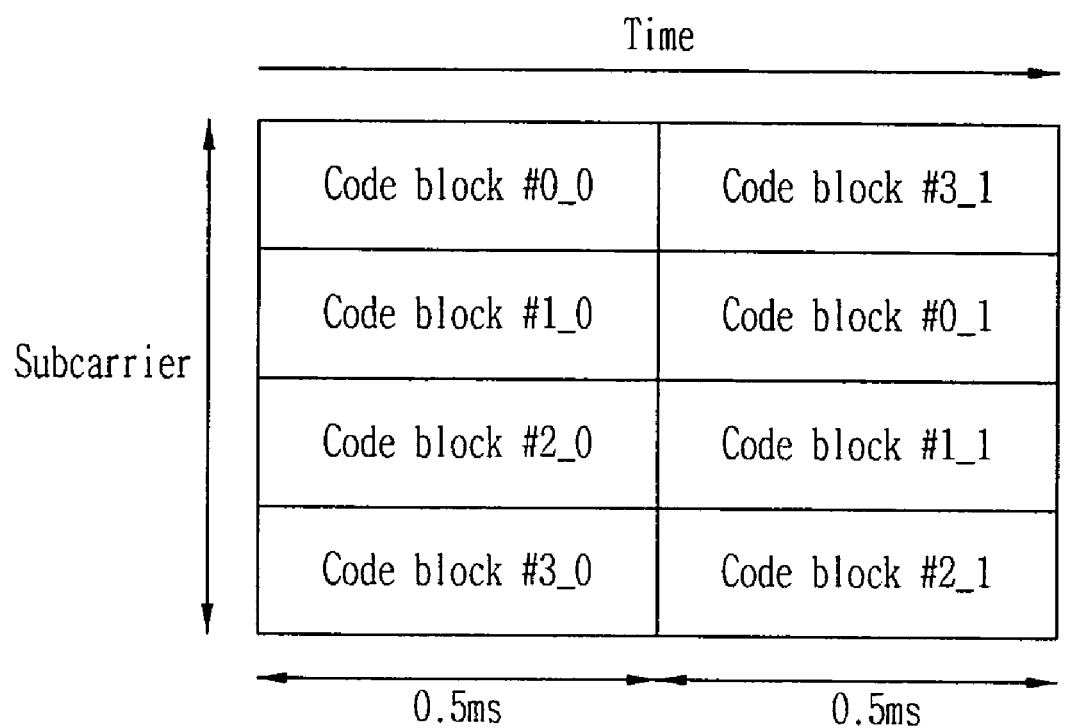
FIG. 22 illustrates another exemplary embodiment of the resource element mapper shown in FIG. 21.

FIG. 22 illustrates another exemplary embodiment of the resource element mapper shown in FIG. 21.

As indicated in FIG. 22, code blocks from #0_0 to #3_0 which are a part of code blocks #0 to #3 may be arranged in the first slot by frequency division. Namely, code blocks are arranged in the order of #0_0, #1_0, #2_0, and #3_0. In the second slot, code blocks may be cyclic-shifted. That is, code blocks are arranged in the order of #3_1, #0_1, #1_1, and #2_1. The length of one code block is the same as the time length of one slot. However, if they are not equal, a next code block may be successively located after one code block. A block expressed by a code block may be a code block, or a block comprised of a set of systematic symbols and parity symbols. A shift direction is not limited to a specific direction. A shifted unit may be 1, an integer greater than 1, numbers of all ranges, a regular interval, or a variable interval.

Figure 23:
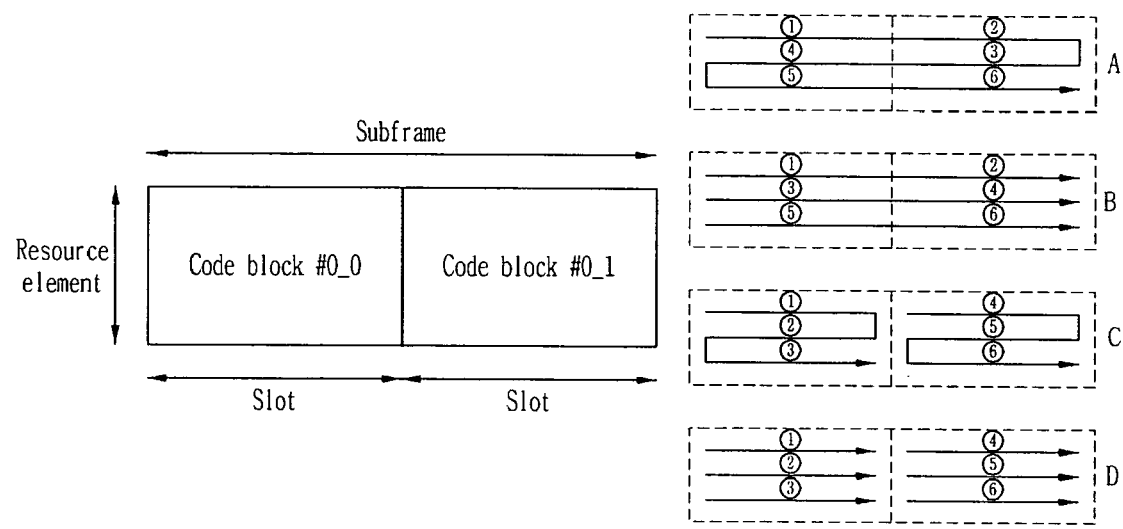
FIG. 23 illustrates a data write direction when data within one code block is mapped to a physical transmission channel according to an exemplary embodiment of the present invention.

FIG. 23 illustrates a data write direction when data within one code block is mapped to a physical transmission channel according to an exemplary embodiment of the present invention.

Referring to FIG. 23, code block #0 is divided into code block #0_0 and code block #0_1, each of which is arranged in one slot. Write start, end, order and heading directions may be forward directions, backward directions, or an arbitrary order. As shown in A, B, C, and D of FIG. 23, data symbols within one code block may be written in order of ①→②→③→④→⑤→⑥. In A, B, C, and D of FIG. 23, time first writing methods are illustrated. However, frequency first writing methods may be used.

Although in FIG. 23 two segmented code blocks are arranged in the same frequency band on different slots, it is possible to arrange two segmented code blocks in different frequency bands on different slots. At this time, the data symbols may be written in order of ①→②→③→④→⑤→⑥.

It will be appreciated that the method of FIG. 23 may be used together with the above-described methods of FIGS. 14 and 15.

Figure 24:
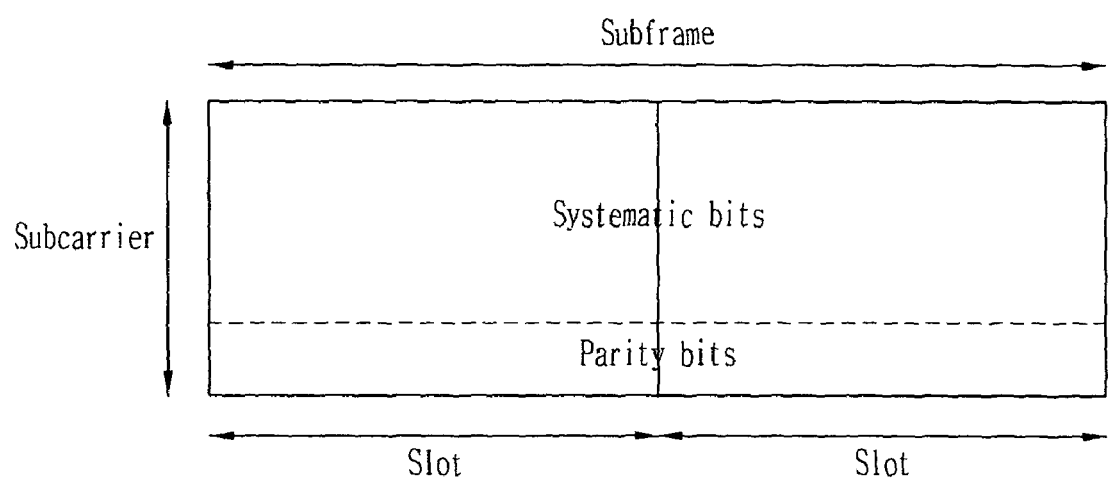
FIG. 24 illustrates a method for mapping a resource element in a resource element mapper when a code block concatenation unit generates systematic symbols and parity symbols as sets of systematic and parity symbols to multiplex data according to another exemplary embodiment of the present invention.

FIG. 24 illustrates a method for mapping a resource element in a resource element mapper, when a code block concatenation unit generates systematic symbols and parity symbols as sets of systematic and parity symbols to multiplex data according to another exemplary embodiment of the present invention.

Referring to FIG. 24, one subframe is comprised of systematic symbols and parity symbols. The amount of systematic symbols and/or parity symbols may be different according to a redundancy version. One subframe may be comprised of systematic symbols only or of parity symbols only. Although in FIG. 24 the systematic symbols are arranged first and the parity symbols are arranged next, the systematic symbols may be arranged after the parity symbols. In each code block, the amount of systematic symbols is similar to the amount of parity symbols. Accordingly, the amount of overwritten systematic symbols by control information is similar or equal to the amount of overwritten parity symbols by control information. The overwritten amounts for respective code blocks are similar or equal to each other. An order for mapping the systematic symbols and parity symbols may be forward directions, backward directions, or an arbitrary order for a slot as shown in FIG. 23 and for a resource element. When sequentially mapping data symbols using the method of FIG. 16 to a physical transmission channel, a result of FIG. 24 can be obtained.

Figure 25:
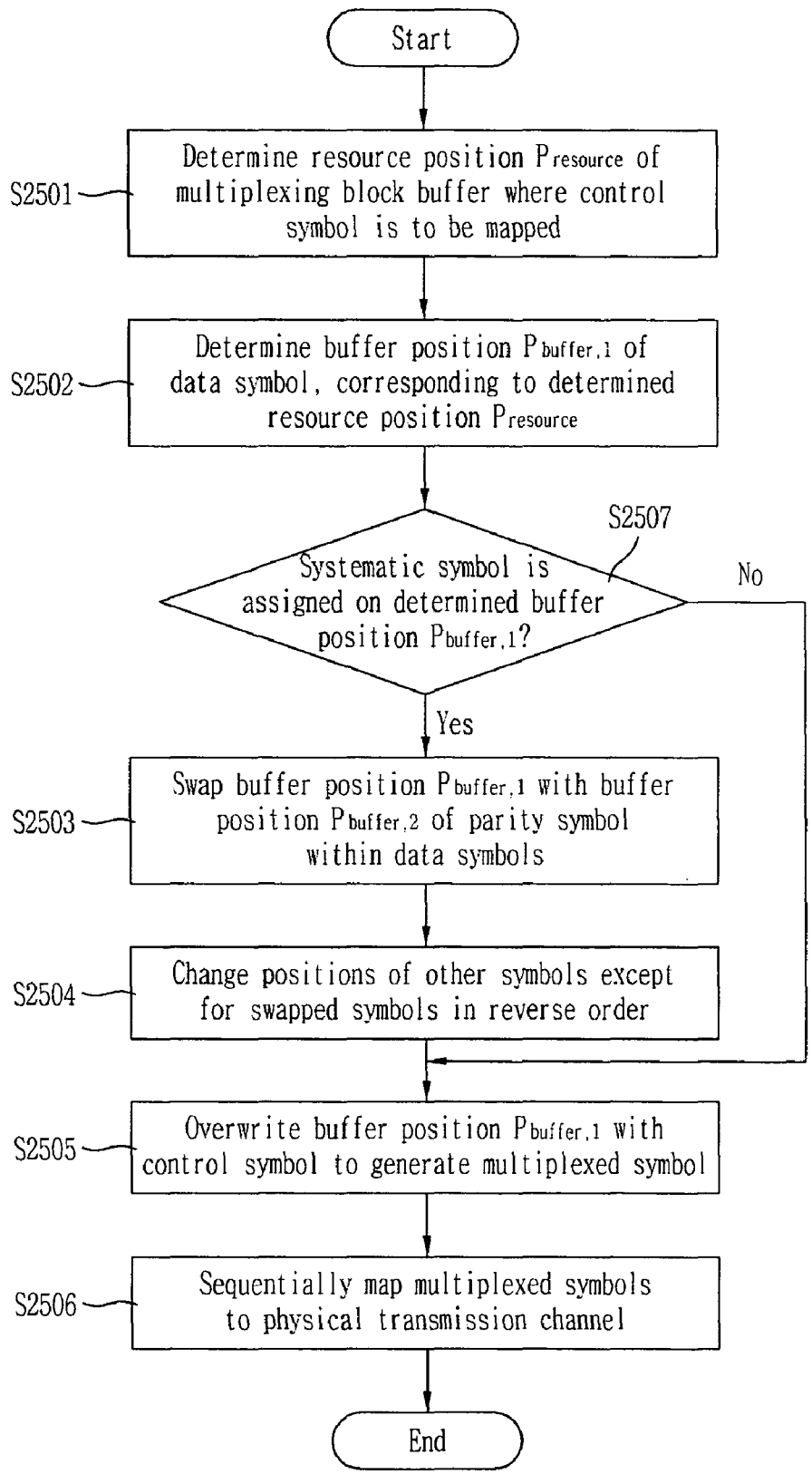
FIG. 25 and FIG. 26 (a) to FIG. 26 (f) illustrate a method for multiplexing data symbols and control information according to another exemplary embodiment of the present invention.
Figure 26:
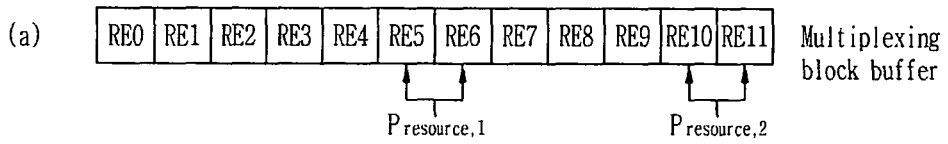
Figure 26:
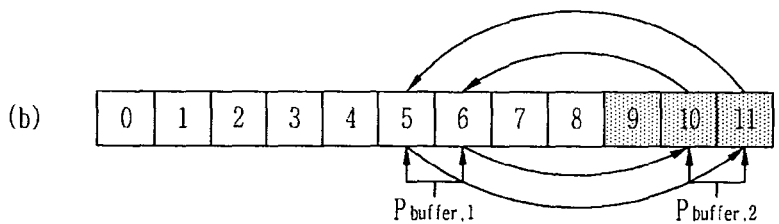
Figure 26:
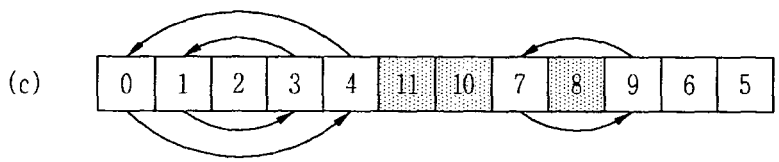
Figure 26:
Figure 26:
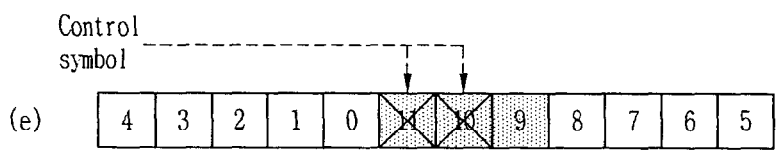
Figure 26:
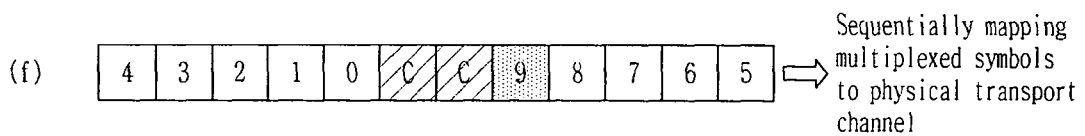
Figure 26:
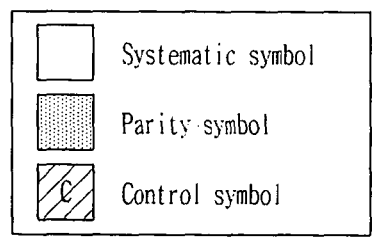

FIG. 25 and FIG. 26 (a) to (f) illustrate a method for multiplexing data symbols and control information according to another exemplary embodiment of the present invention.

FIG. 25 and FIG. 26 (a) to (f) show modifications of FIG. 12. In an actual wireless mobile communication system, the present invention may be achieved through a process of FIG. 25. Referring to FIG. 25, in step S2501, a resource position $P_{resource}$ of a multiplexing block buffer where a control symbol is to be mapped is determined correspondingly to a resource element REc (refer to FIG. 26 (a)). In the exemplary embodiment of FIG. 26, RE5 and RE6 are selected as the resource position $P_{resource}$. In step S2502, a buffer position $P_{buffer,1}$ of a data symbol, corresponding to the determined resource position $P_{resource}$ among data symbols, is determined (refer to FIG. 26 (b)). If a systematic symbol is assigned on the determined buffer position $P_{buffer,1}$, step S2507 proceeds to step S2503. If a parity symbol is assigned on the determined buffer position $P_{buffer,1}$, step S2507 proceeds to step S2505. In step S2503, the determined buffer position $P_{buffer,1}$ is swapped with a buffer position $P_{buffer,2}$ of a parity symbol within data symbols (refer to FIG. 26 (b)). In step S2504, positions of the other symbols except for the swapped symbols among the data symbols are changed in reverse order (refer to FIG. 26 (c) and FIG. 12). After step S2504, FIG. 26 (b) is changed as in FIG. 26 (d). In step S2505, control symbols overwrite the position $P_{buffer,1}$ to generate a multiplexed symbol (refer to FIG. 26 (e)) As a result, the data symbols of FIG. 26 (b) are multiplexed with control information without losing the systematic symbols as shown in FIG. 26 (f). In step S2506, the multiplexed symbols are sequentially mapped to a physical transmission channel. Alternatively, in step S2506, the multiplexed symbols may be sequentially mapped to the multiplexing block buffer and then data of the multiplexing block buffer may be sequentially mapped to the physical transport channel.

Although steps shown in FIG. 26 (b) to (f) are performed in, for example, a cyclic buffer, the multiplexing block buffer may perform such steps. If those steps are performed in the multiplexing block buffer, data symbols stored in the cyclic buffer are sequentially input to the multiplexing block buffer and then the steps shown in FIG. 26 (b) to (f) may be performed.

It will be readily understood that the methods of FIG. 25 and FIG. 26 (a) to (f) may be applied to the methods of FIG. 5 to FIG. 18. Even if data symbols are comprised of multiple code blocks, the methods of FIG. 25 and FIG. 26 (a) to (f) may be easily applied.

The above-described exemplary embodiments are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the exemplary embodiments of the present invention may be rearranged. Some configurations or features of any one embodiment may be included in another embodiment and may be replaced with corresponding configurations or features of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit and receive data with the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is usable in a mobile terminal, a base station, or other equipment of a wireless mobile communication system.

The invention claimed is:

1. A method for multiplexing a control information stream, and a data information stream comprised of one or more systematic bit symbols and one or more non-systematic bit symbols, the method comprising:
mapping the data information stream to a resource area, so that the systematic bit symbols are not mapped to a specific resource area where the control information stream is to be mapped; and
mapping the control information stream to the specific resource area,
wherein the mapping the data information stream to the resource area includes mapping the non-systematic bit symbols to a first resource area including the specific resource area out of the resource area, and mapping the systematic bit symbols to a second resource area except for the first resource area out of the resource area by a predetermined method, and
wherein the predetermined method includes relatively shifting at least a part of the systematic bit symbols within the second resource area by unit of determined symbols.

2. The method according to claim 1, further comprising:
before the mapping the data information stream to a resource area, arranging the one or more systematic bit symbols and the one or more non-systematic bit symbols within the data information stream so that the one or more systematic bit symbols are concatenated to each other and the one or more non-systematic bit symbols are concatenated to each other.

3. The method according to claim 2, wherein the one or more systematic bit symbols and the one or more non-systematic bit symbols are included in one or more code blocks generated from a transport block.

4. The method according to claim 1, wherein the predetermined method includes changing an arrangement order of at least a part of the systematic bit symbols to a reverse order within the second resource area.

5. The method according to claim 1, wherein the mapping the data information stream to a resource area and the mapping the control information stream to the specific resource area are performed by a time first mapping method or a frequency first mapping method.

6. A method for multiplexing a data information stream and a control information stream in a wireless mobile communication system, comprising:
generating a plurality of code blocks each including one or more systematic bit symbols and one or more non-systematic bit symbols from a transport block;
generating the data information stream by concatenating the code blocks;
mapping the data information stream to a resource area, so that the systematic bit symbols of the data information stream are not mapped to a specific resource area where the control information stream is mapped; and
mapping the control information stream to the specific resource area;
wherein, the code blocks of the generated data information stream, the one or more systematic bit symbols included in each code block are concatenated to each other and the one or more non-systematic bit symbols included in each code block are concatenated to each other,
wherein the mapping the data information stream to the resource area includes mapping the non-systematic bit symbols to a first resource area including the specific resource area out of the resource area, and mapping the systematic bit symbols to a second resource area except for the first resource area out of the resource area by a predetermined method, and
wherein the predetermined method includes relatively shifting at least a part of the systematic bit symbols within the second resource area by unit of determined symbols.

7. The method according to claim 6, wherein the predetermined method includes changing an arrangement order of at least a part of the systematic bit symbols to a reverse order within the second resource area.

8. The method according to claim 7, wherein the mapping the data information stream to a resource area and the mapping the information symbol are performed per code block, a part of each code block are mapped by a predetermined order to a first slot within one subframe, and the other part of the each code block are mapped to a second slot within the one subframe by an order different from the predetermined order.

9. The method according to claim 8, wherein the mapping the data information stream to a resource area and the mapping the control information stream to the specific resource area are performed by a time first mapping method or a frequency first mapping method.

10. The method according to claim 6, wherein the mapping the data information stream to a resource area and the mapping the information symbol are performed per code block, a part of each code block are mapped by a predetermined order to a first slot within one subframe, and the other part of the each code block are mapped to a second slot within the one subframe by an order different from the predetermined order.

11. The method according to claim 10, wherein the mapping the data information stream to a resource area and the mapping the control information stream to the specific resource area are performed by a time first mapping method or a frequency first mapping method.

* * * * *